US012715036B2

(12) United States Patent
Peled et al.

(10) Patent No.: US 12,715,036 B2
(45) Date of Patent: Aug. 25, 2026

(54) ORGANIC FORMULATIONS FOR ADDITIVE MANUFACTURING OF THREE-DIMENSIONAL OBJECTS CONTAINING SINTERABLE MATERIALS

(71) Applicant: Tritone Technologies Ltd., Rosh HaAyin (IL)

(72) Inventors: Hagai Peled, Tel-Aviv (IL); Yael Paskovitch, Kfar Saba (IL); Donna Orbaum, RaAnana (IL); Matti Ben-Moshe, Reut Maccabim Modiin (IL)

(73) Assignee: Tritone Technologies Ltd., Rosh HaAyin (IL)

( * ) Notice: Subject to any disclaimer, the term of this patent is extended or adjusted under 35 U.S.C. 154(b) by 426 days.

(21) Appl. No.: 18/036,417

(22) PCT Filed: Nov. 11, 2021

(86) PCT No.: PCT/IL2021/051349
§ 371 (c)(1),
(2) Date: May 11, 2023

(87) PCT Pub. No.: WO2022/101915
PCT Pub. Date: May 19, 2022

(65) Prior Publication Data

US 2025/0262663 A1 Aug. 21, 2025

Related U.S. Application Data

(60) Provisional application No. 63/112,212, filed on Nov. 11, 2020.

(51) Int. Cl.
*B22F 1/107* (2022.01)
*B22F 3/22* (2006.01)
(Continued)

(52) U.S. Cl.
CPC ................ *B22F 1/107* (2022.01); *B22F 3/22* (2013.01); *B22F 10/10* (2021.01);
(Continued)

(58) Field of Classification Search
CPC .. B22F 1/107; B22F 3/22; B22F 10/10; B22F 2998/00; B22F 2999/00; B22F 3/1021;
(Continued)

(56) References Cited

U.S. PATENT DOCUMENTS 5,737,683 A 4/1998 Sterzel
5,824,250 A 10/1998 Whalen et al.
(Continued)

FOREIGN PATENT DOCUMENTS

CN 101449295 6/2009
CN 101306950 1/2011
(Continued)

OTHER PUBLICATIONS

Official Action Dated Aug. 23, 2024 From the US Patent and Trademark Office Re. U.S. Appl. No. 17/414,496. (116 Pages).
(Continued)

*Primary Examiner* — Danielle M. Carda

(57) ABSTRACT

A sinterable paste formulation usable as cast material in a cast-mold process, in combination with a mold material formulation, is provided. The sinterable paste formulation comprises a power of a sinterable material, in an amount of at least 85% by weight of the total weight of the formulation, a binder material as described in the specification, and an organic vehicle, as described in the specification. The formulation is preferably devoid of water. Methods employing the formulation and objects and products obtained therefrom are also provided.

22 Claims, 6 Drawing Sheets

(51) Int. Cl.
*B22F 10/10* (2021.01)
*B33Y 10/00* (2015.01)
*B33Y 70/10* (2020.01)

(52) U.S. Cl.
CPC ....... *B22F 2998/00* (2013.01); *B22F 2999/00* (2013.01); *B33Y 10/00* (2014.12); *B33Y 70/10* (2020.01)

(58) Field of Classification Search
CPC ...... B22F 10/43; B22F 2998/10; B22F 3/225; B22F 3/1025; B22F 3/15; B22F 10/64; B33Y 10/00; B33Y 70/10; C04B 35/62665; C04B 35/632; C04B 2235/528; C04B 2235/5436; C04B 2235/6026; C04B 35/111; C04B 35/14; C04B 35/46; C04B 35/486; C04B 2235/6027; C03C 8/16; C03C 19/06; Y02P 10/25; C03B 19/06
USPC ............................................................ 419/36
See application file for complete search history.

(56) References Cited

U.S. PATENT DOCUMENTS 6,375,880 B1 * 4/2002 Cooper .................. B33Y 70/00 264/318
6,596,224 B1 7/2003 Sachs et al.
8,313,598 B2 11/2012 Butler
9,156,194 B2 10/2015 Ng et al.
9,981,426 B2 5/2018 Guenther et al.
10,137,642 B1 11/2018 Gifford et al.
2002/0033565 A1 3/2002 Hayashi
2003/0044301 A1 3/2003 Lefebvre et al.
2003/0054668 A1 3/2003 Kitano et al.
2005/0015171 A1 1/2005 Cruz-Uribe et al.
2005/0206034 A1 9/2005 Yokoyama et al.
2006/0156978 A1 7/2006 Lipson et al.
2007/0126331 A1 6/2007 Kim et al.
2008/0075619 A1 3/2008 Hosamani et al.
2010/0021638 A1 1/2010 Varanka et al.
2013/0220570 A1 8/2013 Sears et al.
2014/0272121 A1 9/2014 Ng et al.
2014/0277664 A1 9/2014 Stump
2014/0339745 A1 11/2014 Uram
2015/0014885 A1 1/2015 Hofmann et al.
2015/0096467 A1 4/2015 Trivedi et al.
2015/0303366 A1 10/2015 Yoshimi et al.
2015/0352783 A1 12/2015 Snyder et al.
2016/0052212 A1 2/2016 Schmidt
2016/0229128 A1 8/2016 Dayagi et al.
2016/0303654 A1 10/2016 Derguti et al.
2016/0311167 A1 10/2016 Gunther et al.
2016/0354981 A1 12/2016 Bredemeyer et al.
2017/0106444 A1 4/2017 Ishida et al.
2018/0022032 A1 1/2018 Mark et al.
2018/0036417 A1 2/2018 Lam et al.
2018/0071819 A1 3/2018 Connor et al.
2018/0093326 A1 4/2018 Ishida et al.
2018/0193915 A1 7/2018 Fribourg
2018/0250877 A1 9/2018 Okamoto et al.
2018/0277507 A1 9/2018 Sugo et al.
2018/0304365 A1 10/2018 Brzezinski et al.
2019/0002723 A1 * 1/2019 Graddy, Jr. .............. C09D 5/24
2019/0375006 A1 12/2019 Barua et al.
2020/0171568 A1 6/2020 Giller et al.
2020/0269320 A1 8/2020 Ben-Zur et al.
2020/0273596 A1 8/2020 Mori et al.
2020/0338818 A1 10/2020 Teng
2021/0009476 A1 1/2021 Kawai
2021/0031404 A1 2/2021 Yang et al.
2021/0178484 A1 6/2021 Ben-Zur et al.
2021/0197268 A1 7/2021 Nauka et al.
2022/0072613 A1 3/2022 Ben-Zur et al.
2022/0235194 A1 7/2022 Peled

FOREIGN PATENT DOCUMENTS

CN 103612315 3/2014
CN 204136193 2/2015
CN 104798216 7/2015
CN 204451221 7/2015
CN 105834422 8/2016
CN 106270512 1/2017
CN 107864639 3/2018
CN 107877854 4/2018
CN 108083812 5/2018
CN 108550417 9/2018
CN 108550417 A * 9/2018 .............. H01B 1/22
CN 110228996 9/2019
CN 110831711 2/2020
DE 19728113 1/1999
DE 102004035386 9/2005
EP 0688746 1/2000
EP 2714354 4/2014
EP 3302941 4/2018
EP 3600724 2/2020
FR 2944721 10/2010
JP H06-179243 6/1994
JP 10-273703 10/1998
JP 2004-296177 10/2004
JP 2008-263179 10/2008
JP 2015-168135 9/2015
JP 2016-518267 6/2016
JP 2016-132102 7/2016
JP 2016-221894 12/2016
JP 2017-087244 5/2017
JP 2018-059131 4/2018
JP 2018-080359 5/2018
JP 2018-141225 9/2018
WO WO 2007/016469 2/2007
WO WO 2012/164078 12/2012
WO WO 2014/080332 5/2014
WO WO 2014/153535 A2 9/2014
WO WO 2016/124432 8/2016
WO WO 2016/199131 12/2016
WO WO 2017/180314 10/2017
WO WO 2018/102731 6/2018
WO WO 2018/149748 8/2018
WO WO 2018/156933 8/2018
WO WO 2018/203331 11/2018
WO WO 2019/213596 11/2019
WO WO 2020/044336 3/2020
WO WO 2020/129049 6/2020
WO WO 2020/225591 11/2020
WO WO 2021/009748 1/2021
WO WO 2022/101915 5/2022

OTHER PUBLICATIONS

English Summary Dated Aug. 30, 2023 of Decision on Rejection Dated Aug. 16, 2023 From the State Intellectual Property Office of the People's Republic of China Re. Application No. 201980069122.7. (2 pages).
Notice of Reason(s) for Rejection Dated Aug. 22, 2023 From the Japan Patent Office Re. Application No. 2021-510407 and Its Translation Into English. (7 Pages).
Official Action Dated Jun. 25, 2024 from the US Patent and Trademark Office Re. U.S. Appl. No. 16/605,241. (32 pages).
Hearing Notice Dated Feb. 3, 2024 From the Government of India, Intellectual Property India, The Patent Office Re. Application No. 202127010112. (3 Pages).
Official Action Dated Feb. 9, 2024 from the US Patent and Trademark Office Re. U.S. Appl. No. 16/605,241. (41 pages).
Pollinger "Gel Casting", Encyclopedia of Materials: Science and Technology, 4: 3486-3492, 2001.
Supplementary European Search Report and the European Search Opinion Dated Jul. 16, 2025 From the European Patent Office Re. Application No. 21891371.3. (19 Pages).
Official Action Dated Aug. 7, 2024 from the US Patent and Trademark Office Re. U.S. Appl. No. 17/272,316. (12 pages).
Notice of Reason(s) for Rejection Dated Dec. 12, 2023 From the

(56) References Cited

OTHER PUBLICATIONS

Japan Patent Office Re. Application No. 2019-559325 and Its Translation Into English. (16 Pages).
Restriction Official Action Dated Mar. 6, 2024 from the US Patent and Trademark Office Re. U.S. Appl. No. 17/414,496. (9 pages).
Examination Report Dated Sep. 27, 2024 From the Australian Government, IP Australia Re. Application No. 2019330385. (3 Pages).
Hearing Notice Dated Apr. 3, 2024 From the Government of India, Intellectual Property India, The Patent Office Re. Application No. 202127053942. (2 Pages).
Office Action Dated Feb. 20, 2024 From the Israel Patent Office Re. Application No. 281151. (6 Pages).
Official Action Dated Jun. 3, 2025 from the US Patent and Trademark Office Re. U.S. Appl. No. 17/609,391. (16 Pages).
Examination Report Dated Feb. 3, 2025 From the Australian Government, IP Australia Re. Application No. 2019444497. (3 Pages).
Official Action Dated Oct. 19, 2023 from the US Patent and Trademark Office Re. U.S. Appl. No. 17/272,316. (35 pages).
English Summary and Translation Dated Dec. 27, 2023 of Notification of Office Action Dated Dec. 14, 2023 From the State Intellectual Property Office of the People's Republic of China Re. Application No. 201980097281.8. (2 Pages).
Official Action Dated Apr. 16, 2024 from the US Patent and Trademark Office Re. U.S. Appl. No. 17/272,316. (29 pages).
English Summary and Translation Dated Sep. 28, 2023 of Notification of Office Action Dated Sep. 14, 2023 From the State Intellectual Property Office of the People's Republic of China Re. Application No. 201980097281.8. (2 pages).
Communication Pursuant to Article 94(3) EPC Dated Aug. 27, 2024 From the European Patent Office Re. Application No. 18794491.3. (11 Pages).
Requisition by the Examiner Dated Sep. 9, 2025 From the Innovation, Science and Economic Development Canada, Canadian Intellectual Property Office Re. Application No. 3,139,121 including Claims. (7 Pages).
Hearing Notice Dated Oct. 30, 2023 From the Government of India, Intellectual Property India, The Patent Office Re. Application No. 201927048618. (3 Pages).
Advisory Action Dated Dec. 6, 2024 from the US Patent and Trademark Office Re. U.S. Appl. No. 16/605,241. (5 pages).
Decision of Reexamination Dated Dec. 10, 2024 From the State Intellectual Property Office of the People's Republic of China Re. Application No. 201880043485.9 with its Machine Translation into English. (52 Pages).
Official Action Dated Nov. 21, 2024 from the US Patent and Trademark Office Re. U.S. Appl. No. 17/272,316. (20 pages).
Official Action Dated Nov. 21, 2024 from the US Patent and Trademark Office Re. U.S. Appl. No. 17/609,391. (106 pages).
Advisory Action Dated Jan. 25, 2023 from the US Patent and Trademark Office Re. U.S. Appl. No. 17/272,316. (4 pages).
Examination Report Under Sections 12 & 13 of the Patents Act, 1970 and the Patents Rules, 2003 Dated Aug. 16, 2022 From the Government of India, Intellectual Property India, Patents, Designs, Trade Marks, Geographical Indications, The Patent Office Re. Application No. 202127010112. (6 Pages).
Examination Report Under Sections 12 & 13 of the Patents Act, 1970 and the Patents Rules, 2003 Dated May 26, 2023 From the Government of India, Intellectual Property India, Patents, Designs, Trade Marks, Geographical Indications, The Patent Office Re. Application No. 202127053942. (6 pages).
Examination Report Under Sections 12 & 13 of the Patents Act, 1970 and the Patents Rules, 2003 Dated Jan. 27, 2022 From the Government of India, Intellectual Property India, Patents, Designs, Trade Marks, Geographical Indications, The Patent Office Re. Application No. 201927048618. (7 Pages).
Final Official Action Dated Oct. 6, 2022 From the US Patent and Trademark Office Re. U.S. Appl. No. 17/272,316. (23 Pages).
Final Official Action Dated Mar. 10, 2023 from the US Patent and Trademark Office Re. U.S. Appl. No. 16/605,241. (48 pages).
International Preliminary Report on Patentability May 25, 2023 From the International Bureau of WIPO Re. Application No. PCT IL2021/051349. (9 Pages).
International Preliminary Report on Patentability Dated Jan. 11, 2021 From the International Preliminary Examining Authority Re. Application No. PCT/IL2019/050957. (15 Pages).
International Preliminary Report on Patentability Dated Apr. 13, 2021 From the International Preliminary Examining Authority Re. Application No. PCT/IL2019/051362. (11 Pages).
International Preliminary Report on Patentability Dated Nov. 18, 2021 From the International Bureau of WIPO Re. Application No. PCT/IB2019/053749. (8 Pages).
International Preliminary Report on Patentability Dated Aug. 27, 2019 From the International Preliminary Examining Authority Re. Application No. PCT/IL2018/050475. (11 Pages).
International Search Report and the Written Opinion Dated Dec. 2, 2019 From the International Searching Authority Re. Application No. PCT/IL2019/050957. (24 Pages).
International Search Report and the Written Opinion Dated Apr. 3, 2022 From the International Searching Authority Re. Application No. PCT/IL2021/051349. (16 Pages).
International Search Report and the Written Opinion Dated Sep. 11, 2019 From the International Searching Authority Re. Application No. PCT/IB2019/053749. (15 Pages).
International Search Report and the Written Opinion Dated Aug. 12, 2018 From the International Preliminary Examining Authority Re. Application No. PCT/IL2018/050475. (14 Pages).
International Search Report and the Written Opinion Dated Mar. 17, 2020 From the International Searching Authority Re. Application No. PCT/IL2019/051362. (13 Pages).
Interview Summary Dated Mar. 10, 2023 from the US Patent and Trademark Office Re. U.S. Appl. No. 17/272,316. (2 pages).
Notice of Reason(s) for Rejection Dated Apr. 4, 2023 From the Japan Patent Office Re. Application No. 2021-566051. and Its Translation Into English. (7 pages).
Notice of Reason(s) for Rejection Dated Feb. 8, 2022 From the Japan Patent Office Re. Application No. 2019-559325. and Its Translation Into English. (9 Pages).
Notice of Reason(s) for Rejection Dated Apr. 25, 2023 From the Japan Patent Office Re. Application No. 2021-510407 and Its Translation Into English. (18 Pages).
Notice of Reason(s) for Rejection Dated Sep. 27, 2022 From the Japan Patent Office Re. Application No. 2019-559325 and Its Translation Into English. (9 Pages).
Notification of Office Action and Search Report Dated Jul. 4, 2022 From the State Intellectual Property Office of the People's Republic of China Re. Application No. 201980069122.7. (7 Pages).
Notification of Office Action and Search Report Dated Nov. 11, 2022 From the State Intellectual Property Office of the People's Republic of China Re. Application No. 201980097281.8. (8 Pages).
Notification of Office Action and Search Report Dated Sep. 30, 2020 From the State Intellectual Property Office of the People's Republic of China Re. Application No. 201880043485.9 and Its Translation of Office Action Into English .. (14 Pages).
Office Action Dated Mar. 5, 2023 From the Israel Patent Office Re. Application No. 270345. (7 Pages).
Official Action Dated May 16, 2022 from US Patent and Trademark Office Re. U.S. Appl. No. 17/272,316. (41 pages).
Official Action Dated Apr. 27, 2022 from US Patent and Trademark Office Re. U.S. Appl. No. 16/605,241. (66 pages).
Pre Appeal Examination Dated Mar. 23, 2023 From the Japan Patent Office Re. Application No. 2019-559325 and Its Translation Into English. (9 Pages).
Restriction Official Action Dated Dec. 13, 2021 from US Patent and Trademark Office Re. U.S. Appl. No. 17/272,316. (8 pages).
Restriction Official Action Dated Jan. 19, 2022 from US Patent and Trademark Office Re. U.S. Appl. No. 16/605,241. (8 pages).
Summary Dated Dec. 1, 2022 of Notification of Office Action Dated Nov. 11, 2022 From the State Intellectual Property Office of the People's Republic of China Re. Application No. 201980097281.8. (2 Pages).

(56) References Cited

OTHER PUBLICATIONS

Summary Dated Mar. 14, 2023 of Notification of Office Action Dated Feb. 25, 2023 From the State Intellectual Property Office of the People's Republic of China Re. Application No. 201980069122.7. (6 Pages).
Supplementary European Search Report and the European Search Opinion Dated Sep. 13, 2022 From the European Patent Office Re. Application No. 19898883.4. (10 pages).
Supplementary European Search Report and the European Search Opinion Dated Apr. 20, 2022 From the European Patent Office Re. Application No. 19856125.0. (11 Pages).
Supplementary European Search Report and the European Search Opinion Dated May 24, 2022 From the European Patent Office Re. Application No. 18794491.3. (10 Pages).
Supplementary European Search Report and the European Search Opinion Dated Mar. 31, 2023 From the European Patent Office Re. Application No. 19927676.7. (9 Pages).
Translation dated Nov. 8, 2021 of Notification of Office Action and Search Report Dated Oct. 19, 2021 From the State Intellectual Property Office of the People's Republic of China Re. Application No. 201880043485.9. (6 Pages).
Translation Dated Jun. 22, 2021 of Notification of Office Action Dated Jun. 2, 2021 From the China National Intellectual Property Administration Re. Application No. 201880043485.9. (6 Pages).
Translation Dated Jul. 25, 2022 of Notification of Office Action Dated Jul. 4, 2022 From the State Intellectual Property Office of the People's Republic of China Re. Application No. 201980069122.7. (3 Pages).
Fraunhofer IFAM "Welcome to Fraunhofer IFAM Dresden", Fraunhofer Institute for Manufacturing Technology and Advanced Materials IFAM, Homepage: Profile, 5 P., 2019.
Rapidia Tech "The Fastest and Simplest Way to 3D Print Metal", Rapidia Tech, Website, 6 P., 2019.
Decision on Rejection Dated Aug. 16, 2023 From the State Intellectual Property Office of the People's Republic of China Re. Application No. 201980069122.7 and Its Machine Translation Into English. (12 Pages).
Notice of Reason(s) for Rejection Dated Aug. 15, 2023 From the Japan Patent Office Re. Application No. 2021-566051. and Its Translation Into English. (6 pages).
Restriction Official Action Dated May 13, 2024 from the US Patent and Trademark Office Re. U.S. Appl. No. 17/609,391. (16 pages).
Communication Pursuant to Article 94(3) EPC Dated Oct. 13, 2023 From the European Patent Office Re. Application No. 19856125.0 (5 Pages).
Advisory Action Dated Oct. 4, 2024 from the US Patent and Trademark Office Re. U.S. Appl. No. 16/605,241. (5 pages).
English Summary of Notice of Re-examination Dated Jun. 22, 2024 From the State Intellectual Property Office of the People's Republic of China Re. Application No. 201880043485.9. (3 Pages).
Notice of Re-examination Dated Jun. 22, 2024 From the State Intellectual Property Office of the People's Republic of China Re. Application No. 201880043485.9 and Its Machine Translation. (31 Pages).
Office Action Dated Jul. 11, 2024 From the Israel Patent Office Re. Application No. 287869. (4 Pages).
Li "Introduction to 3D Printing Technology," edited by Shi Yusheng, pp. 1-4, IIubei Science and Technology Press, publication date: Feb. 2016.
Translation Dated Jan. 23, 2024 of Notice of Reason(s) for Rejection Dated Dec. 12, 2023 From the Japan Patent Office Re. Application No. 2021-531292. (4 pages).
Official Action Dated Dec. 23, 2025 from the US Patent and Trademark Office Re. U.S. Appl. No. 17/609,391. (18 Pages).
Office Action Dated May 13, 2026 From the Israel Patent Office Re. Application No. 302847. (8 Pages).

* cited by examiner

ORGANIC FORMULATIONS FOR ADDITIVE MANUFACTURING OF THREE-DIMENSIONAL OBJECTS CONTAINING SINTERABLE MATERIALS

RELATED APPLICATIONS

This application is a National Phase of PCT Patent Application No. PCT/IL2021/051349 having International filing date of Nov. 11, 2021, which claims the benefit of priority under 35 USC § 119 (e) of U.S. Provisional Patent Application No. 63/112,212 filed on Nov. 11, 2020. The contents of the above applications are all incorporated by reference as if fully set forth herein in their entirety.

FIELD AND BACKGROUND OF THE INVENTION

The present invention, in some embodiments thereof, relates to additive manufacturing, and, more particularly, but not exclusively, to formulations containing sinterable materials such as metal and ceramic powders, which are usable in additive manufacturing and in other processes for providing objects containing sinterable materials and in the subsequent provision of products containing sintered materials.

Additive manufacturing (AM), or solid freeform fabrication (SFF), is generally a process in which a three-dimensional (3D) object is manufactured utilizing a computer model of the objects. The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three-dimensional (3D) printing. Such techniques are generally performed by layer by layer deposition and solidification of one or more building materials.

In three-dimensional printing processes, for example, a building material is dispensed from a printing head having a set of nozzles to deposit layers on a supporting structure. Depending on the building material, the layers may then solidify, harden or be cure, optionally using a suitable device.

Generally, in AM, three-dimensional objects are fabricated based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by the building material, and which type of building material is to be delivered thereto. The decision is made according to a computer image of the surface.

Additive Manufacturing, or 3D printing, is widely used today to make prototype parts and for small-scale manufacturing. A widely used technique is fused deposition modeling (FDM) in which a plastic filament is unwound from a coil, fused and passed through a nozzle to be laid down as flattened strings to form layers from which a 3D object eventually emerges.

Another technique that is used is stereolithography. Stereolithography is an additive manufacturing process that works by focusing an ultraviolet (UV) laser on to a vat of photopolymer resin. With the help of computer aided manufacturing or computer aided design software (CAM/CAD), the UV laser is used to draw a pre-programmed design or shape on to the surface of the photopolymer vat. Because photopolymers are photosensitive under ultraviolet light, the resin is solidified and forms a single layer of the desired 3D object. The process is repeated for each layer of the design until the 3D object is complete.

Selective Laser Sintering, SLS, is another additive manufacturing layer technology, and involves the use of a high power laser, for example, a carbon dioxide laser, to fuse small particles of plastic into a mass that has a desired three-dimensional shape. The laser selectively fuses powdered material by scanning cross-sections generated from a 3-D digital description of the part (for example from a CAD file or scan data) on the surface of a powder bed. After each cross-section is scanned, the powder bed is lowered by one layer thickness, a new layer of material is applied on top, and the process is repeated until the part is completed.

Due to their relatively high melting temperatures, metal and ceramic materials are more difficult to use in additive manufacturing procedures.

Additive Manufacturing technologies are in general slow compared to conventional production processes such as machining etc. due to the building process of forming the part layer by layer.

Furthermore, there are certain shapes that cannot be achieved by straightforward Additive Manufacturing. Some of these shapes can be achieved by printing out support areas that are later removed.

A metal printing technique which is widely used is the DMLS—Direct Metal Sintering Laser. A very thin layer of metal powder is spread across the surface that is to be printed. A laser is slowly and steadily moved across the surface to sinter the powder. Additional layers of powder are then applied and sintered, thus “printing” the object one cross-section at a time. In this way, DMLS gradually builds up a 3D object through a series of very thin layers.

Another method of 3D metal printing is selective laser melting (SLM), in which a high-powered laser fully melts each layer of metal powder rather than just sintering it. Selective laser melting produces printed objects that are extremely dense and strong. Selective laser melting can only be used with certain metals. The technique can be used for the additive manufacturing of stainless steel, tool steel, titanium, cobalt, chrome, and aluminum parts. Selective laser melting is a very high-energy process, as each layer of metal powder must be heated above the melting point of the metal. The high temperature gradients that occur during SLM manufacturing can also lead to stresses and dislocations inside the final product, which can compromise its physical properties.

Electron beam melting (EBM) is an additive manufacturing process that is very similar to selective laser melting. Like SLM, it produces models that are very dense. The difference between the two techniques is that EBM uses an electron beam rather than a laser to melt the metal powder.

Currently, electron beam melting can only be used with a limited number of metals. Titanium alloys are the main starting material for this process, although cobalt chrome can also be used.

The above-described metal printing technologies are expensive, very slow, and limited by build size and materials that can be used.

Binder Jet 3D-Printing is widely used to print sand molds for castings or to generate complex ceramic parts. It is also known as a Metal Additive Manufacturing technology. Instead of melting the material, as is done in Selective Laser Melting (SLM) or Electron Beam Melting (EBM), the metal powders are selectively joined by an adhesive ink. The "green" part is afterwards going through thermal processes-debinding and sintering and in some cases also infiltration of additional materials.

A technique for printing of ceramics is disclosed in Ceramics 3D Printing by Selective Inhibition Sintering—Khoshnevis et al., in which, as with metal, an inhibition material forms a boundary defining edges around a ceramic powder layer which is then sintered. The inhibition layer is subsequently removed.

US Patent Publication No. 2014/0339745A1 to Stuart Uram, discloses a method of making an object using mold casting comprising applying a slip mixture into a mold fabricated using Additive Manufacturing and then firing the mold with the mixture inside. The disclosure discusses a composition of 10-60% by weight of calcium aluminate and a filler.

Powder Injection Molding (PIM) is a process by which finely-powdered metal (in MIM-Metal Injection Molding) or ceramic (in CIM—Ceramic Injection Molding) is mixed with a measured amount of binder material to comprise a feedstock capable of being handled by injection molding. The molding process allows dilated complex parts, which are oversized due to the presence of binder agent in the feedstock, to be shaped in a single step and in high volume.

After molding, the powder-binder mixture is subjected to debinding steps that remove mold and the binder, and sintering, to densify the powders. End products are small components used in various industries and applications. The nature of the PIM feedstock flow is defined using rheology. Current equipment capability requires processing to stay limited to products that can be molded using typical volumes of 100 grams or less per shot into the mold. The variety of materials capable of implementation within PIM feedstock is broad. Subsequent conditioning operations are performed on the molded shape, where the binder material is removed and the metal or ceramic particles are diffusion bonded and densified into the desired state with typically 15% shrinkage in each dimension. Since PIM parts are made in precision injection molds, similar to those used with plastic, the tooling can be quite expensive. As a result, PIM is usually used only for higher-volume parts.

A use of a printable mass containing a paste made of a metal powder and a binder in 3D-screen printing has been practiced by the Fraunhofer Institute for Manufacturing Technology and Advanced Materials. See, for example, www(dot)ifam-dd(dot)fraunhofer(dot)de.

3D metal printing using solvent-free water-based metal, ceramic or support paste is described in www(dot)rapidia (dot)com. Printed objects are transferred directly to a furnace for sintering and polymeric support materials evaporate during sintering.

WO 2020/225591, by the present assignee, discloses a sinterable paste formulation usable as a cast material in a cast-mold process in combination with a mold material formulation, which comprises a powder of a sinterable material, a binder and an aqueous solution.

Cast-mold processes and systems in which a formulation such as described in WO 2020/225591 can be beneficially utilized are disclosed in PCT International Patent Application Publication Nos. WO 2018/203331, WO 2020/044336, WO 2020/129049, WO 2021/009748, and WO 2021/095036, all by the present assignee, and all being incorporated by reference as if fully set forth herein.

Additional background art includes U.S. Provisional Patent Application No. 63/122,967, filed Dec. 9, 2020 and having Attorney's Docket No. 89935, also by the present assignee, which describes a mold formulation suitable for use in the mold-cast processes as described herein in combination with a sinterable formulation.

SUMMARY OF THE INVENTION

According to an aspect of some embodiments of the present invention there is provided a sinterable paste formulation usable as cast material in a cast-mold process in combination with a mold material formulation, the sinterable paste formulation comprising a powder of a sinterable material, a binder material and an organic vehicle, wherein an amount of water in the formulation is less than 5%, or less than 2%, or less than 1%, or less than 0.5%, or less than 0.1%, by weight, of the total weight of the formulation.

According to some of any of the embodiments described herein, the formulation is devoid of water.

As used herein throughout, the phrase "devoid of" encompasses the presence of minute amounts of the indicated substance (for example, less than 0.1% by weight, less than 0.01% by weight, and less than 0.001% by weight), as well as the complete absence of the indicated substance (e.g., water).

According to some of any of the embodiments described herein, an amount of the powder of the sinterable material is at least 85% by weight of the total weight of the formulation.

According to some of any of the embodiments described herein, the organic vehicle comprises at least one organic material that has an evaporation rate of at least 0.1, or at least 0.3, on an n-butyl acetate scale.

According to some of any of the embodiments described herein, the organic vehicle comprises at least one organic material that has an evaporation rate in a range of from 0.3 to 0.8 on an n-butyl acetate scale.

According to some of any of the embodiments described herein, an amount of the organic material that has the evaporation rate is at least 50% by weight of the total weight of the organic vehicle.

According to some of any of the embodiments described herein, the organic vehicle comprises at least one organic material that has an evaporation rate in a range of from 0.3 to 0.8 on an n-butyl acetate scale, and at least one organic material that has an evaporation rate higher than 2 or higher than 3.

According to some of any of the embodiments described herein, the organic vehicle comprises an alkylene glycol.

According to some of any of the embodiments described herein, the organic vehicle comprises a mixture of an alkylene glycol and a ketone.

According to some of any of the embodiments described herein, the organic vehicle comprises a ketone.

According to some of any of the embodiments described herein, the organic vehicle comprises a an alcohol, preferably an alcohol that features a low evaporation rate as described herein, optionally in combination with a ketone as described herein.

According to some of any of the embodiments described herein, a total amount of the organic vehicle ranges from 4 to 15, or from 4 to 10, or from 4 to 8, % by weight of the total weight of the formulation.

According to some of any of the embodiments described herein, the organic vehicle and the binder material are selected such that the binder material is dissolvable and/or dispersible in the organic vehicle.

According to some of any of the embodiments described herein, the organic vehicle and the binder material are selected as chemically inert to one another.

According to some of any of the embodiments described herein, the organic vehicle and the binder material are selected capable of physically interacting with one another.

According to some of any of the embodiments described herein, an amount of the binder material is no more than 10%, or no more than 5%, or no more than 2%, by weight of the total weight of the formulation.

According to some of any of the embodiments described herein, an amount of the binder material ranges from 0.5 to 2, or from 0.8 to 2, % by weight of the total weight of the formulation.

According to some of any of the embodiments described herein, the binder material is thermolizable at a temperature lower by at least 100° C. than a sintering temperature of the sinterable material.

According to some of any of the embodiments described herein, the binder material remains intact when subjected to a condition under which the mold material is removed.

According to some of any of the embodiments described herein, the binder material has a Tg of at least 25, or at least 30° C.

According to some of any of the embodiments described herein, the binder material comprises a mixture of at least two binders, and wherein each of the binders has a Tg in a range of from 25 to 150, or from 25 to 100, or from 30 to 150, or from 30 to 100, or from 30 to 80° C.

According to some of any of the embodiments described herein, the binder material is characterized by a film forming temperature (TMF) of at least 0, or of at least 5, or of at least 10° C.

According to some of any of the embodiments described herein, the binder material is devoid of an aqueous solution (i.e., is not in a form of an emulsion).

According to some of any of the embodiments described herein, the formulation features a shear-thinning behavior at atmospheric pressure.

According to some of any of the embodiments described herein, the formulation features no shear-thinning behavior under reduced pressure of 5 mBar or of 10 mBar.

According to some of any of the embodiments described herein, the mold material formulation comprises a hydrocarbon of at least 20 carbon atoms.

According to some of any of the embodiments described herein, the formulation comprises from 85 to 95% by weight of the powder of the sinterable material; from 4 to 10% by weight of the organic vehicle; and from 0.8 to 2% by weight of the binder material.

According to some of any of the embodiments described herein, the formulation further comprises a dispersing agent, a thickening agent, a surfactant, a rheology modifying agent, a film forming agent or a combination of any of the foregoing.

According to some of any of the embodiments described herein, the formulation comprises at least one dispersing agent that features an affinity to the sinterable material.

According to some of any of the embodiments described herein, the powder of the sinterable material has an average particles size (d50) lower than 50 micrometer, or lower than 45 micrometer, or lower than 40 micrometer, or lower than 30 micrometer, or lower than 25 micrometer, or lower than 22 micrometer, or lower than 20 micrometer, or lower than 16 micrometer.

According to some of any of the embodiments described herein, the powder comprises in at least a portion thereof a plurality of spherical particles.

According to some of any of the embodiments described herein, the powder comprises in at least a portion thereof a gas-atomized powder.

According to some of any of the embodiments described herein, the sinterable material is a metal.

According to some of any of the embodiments described herein, the metal is an oxygen-sensitive metal.

According to some of any of the embodiments described herein, the formulation comprises or is consisted of the materials presented in Table 1, Table 2 or Table 3.

According to an aspect of some embodiments of the present invention there is provided a process of preparing the formulation as described herein in any of the respective embodiments, the process comprising mixing the binder material, the organic vehicle and the powder at room temperature.

According to an aspect of some embodiments of the present invention there is provided a method of forming a three-dimensional object which comprises a sintered material, the method comprising:

forming a mold according to a shape of the object, using a mold material formulation; filling the mold with a sinterable formulation as described herein in any of the respective embodiments, to thereby obtain a mold-cast product; removing the mold from the mold-cast product, to thereby obtain a green body; removing the binder from the green body to thereby obtain a brown body; and subjecting the brown body to a sintering condition, thereby forming the object.

According to some of any of the embodiments described herein, the filling comprises placing the sinterable paste formulation (as a cast material formulation) in the mold, for example, pouring the sinterable paste formulation into the mold.

According to some of any of the embodiments described herein, the filling comprises injection molding of the sinterable paste formulation (as a cast material formulation) into the mold.

According to some of any of the embodiments described herein, the filling comprises using a squeegee pressed against the mold to spread the sinterable formulation into the mold, or wherein the filling comprises using a blade spaced from the mold surface to spread the sinterable formulation into the mold.

According to some of any of the embodiments described herein, removing the mold comprises at least one of applying heat and contacting the mold with an organic solvent (which is different from the organic vehicle included in the sinterable formulation).

According to some of any of the embodiments described herein, the method further comprises, prior to removing the mold, hardening the mold-cast object.

According to some of any of the embodiments described herein, forming the mold comprises forming a layered mold by dispensing a plurality of layers of the mold material formulation in a configured pattern corresponding to the shape of the object.

According to some of any of the embodiments described herein, the method comprises:

printing a first layer of the mold material to define one layer of the layered mold; filling the first mold with the sinterable formulation, thereby forming a first mold-cast layer; printing a second layer of the mold on top of the first mold-cast layer to define a second layer of the layered mold; and filling the second layer, over the first layer, with the sinterable formulation.

According to some of any of the embodiments described herein, the method further comprises finishing the first layer after forming and prior to printing the second mold; thereby to form the second layer on the finished surface of the first layer.

According to some of any of the embodiments described herein, the method further comprises, subsequent to the filling, hardening the mold-cast layer.

According to some of any of the embodiments described herein, the hardening comprises subjecting the mold-cast layer to a reduced pressure for a pre-determined time period.

According to some of any of the embodiments described herein, the method further comprises, prior to subjecting to a reduced pressure, applying hot air to the mold-cast layer.

According to some of any of the embodiments described herein, the reduced pressure ranges from 0.01 millibar to 100 milliBar, or from 0.1 millibar to 25 millibar, or from 1 to 10 millibar.

According to some of any of the embodiments described herein, the pre-determined time period ranges from 10 to 150 seconds, or is about thirty seconds.

According to an aspect of some embodiments of the present invention there is provided a product object comprising a sintered material, obtained by a method as described herein in any of the respective embodiments.

According to an aspect of some embodiments of the present invention there is provided an article-of-manufacturing comprising the product as described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Operation of the 3D printing device of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
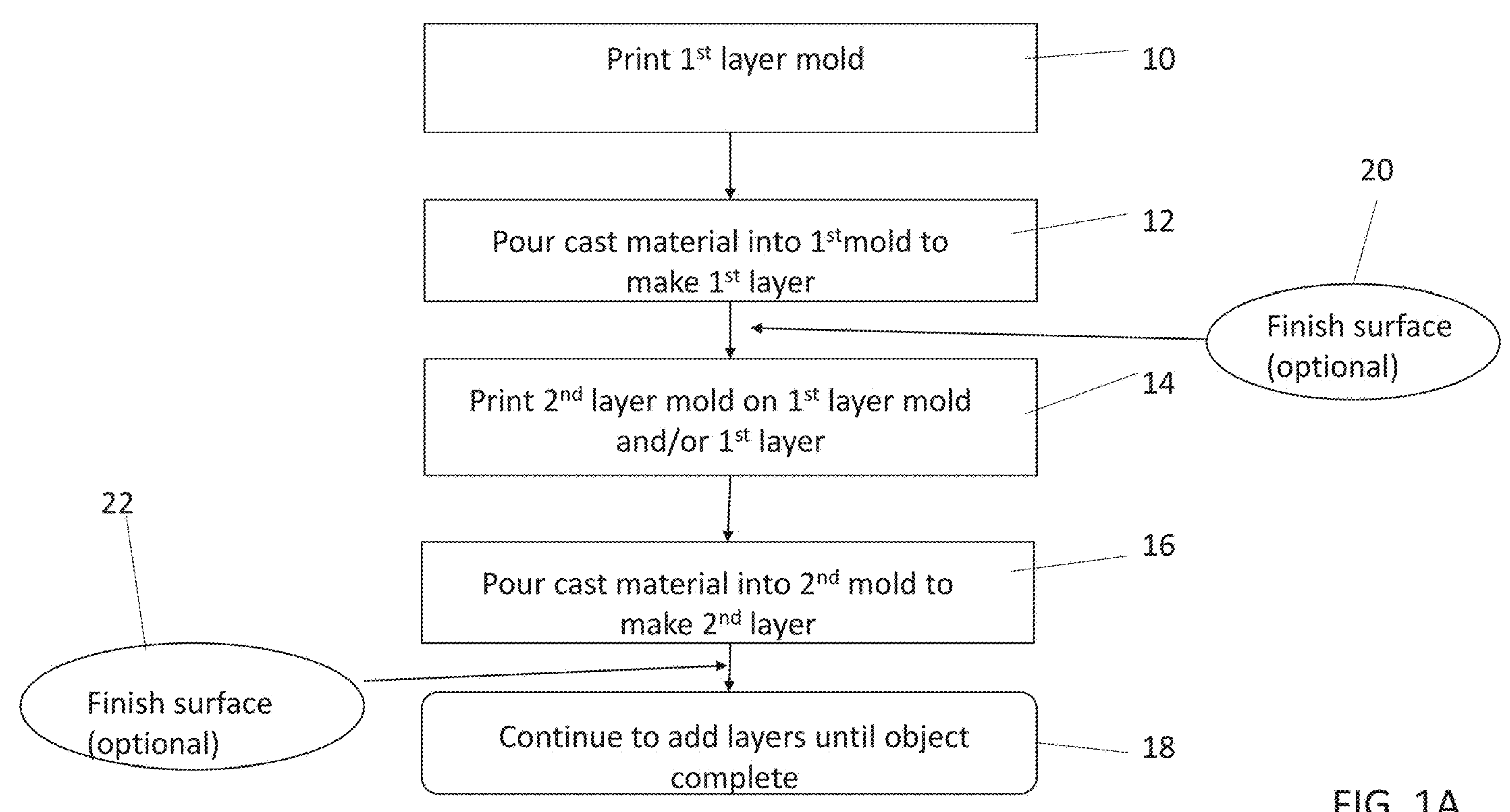
FIG. 1A is a simplified flow chart illustrating a procedure for producing a layered molded product or part according to some embodiments of the present invention.

The present invention, in some embodiments thereof, relates to additive manufacturing, and, more particularly, but not exclusively, to formulations containing sinterable materials such as metal and/or ceramic powders, which are usable in additive manufacturing and other processes which provide objects containing sinterable materials and in the subsequent provision of products containing respective sintered materials. The formulations are particularly usable as cast materials in additive manufacturing processes that involve mold-casting methodologies and/or application of reduced pressure.

As discussed in the Background section hereinabove, additive manufacturing of three-dimensional objects containing in at least a portion thereof metal and/or ceramic materials is highly advantageous over methodologies such as machining and rapid prototyping manufacturing, yet pose some challenges in rendering the AM process efficient. Some of the currently practiced processes of AM of objects made of metals and/or ceramics employ metal/ceramic powders, possibly in a form of metal/ceramic paste that further comprises a binder.

PCT International Patent Application Publication No. WO 2018/203331, by the present assignee, discloses a methodology for Additive Manufacturing of objects made of ceramics and/or metals that is relatively fast, capable of creating complex geometries and compatible with a large variety of materials. The disclosure teaches combining Additive Manufacturing with molding techniques in order to build shapes that have hitherto not been possible with conventional molding or machining technologies or in order to use materials that are difficult or impossible to use with known Additive Manufacturing technologies, or to build shapes faster than is possible with known Additive Manufacturing technologies. In examples, Additive Manufacturing is used to make a mold, using a mold material, and then the mold is filled with the material of the final product (a cast material). The cast material can include a sinterable material, such as, for example, a metal or ceramic powder, and as defined herein. In some variants, layers of the final product are separately constructed with individual molds, where a subsequent layer is made over a previously molded layer. The previously molded layer may in fact support the mold of the new layer, as well as provide the floor for the new layer.

In one variant, a printing unit is provided which has a first nozzle for 3D printing material to form the mold, and a second, separate, nozzle to provide the filler (the cast material). The second nozzle may be adjusted to provide different size openings to fill different sized molds efficiently. In other variants two separate applicators are provided, one for printing the mold and having three degrees of freedom as needed for 3D printing, and one for filling the mold after it has been formed with the cast material.

One variant comprises the use of inkjet print heads to print the mold using wax or any other hot melt (e.g., as phase transfer ink) or thermosetting material, and the possibility to level the deposited layer of the cast material, when it is in a form of a paste, by use of a self-leveling cast material. An alternative for leveling the cast material is by vibrating the cast material just after molding, and a further alternative comprises using mechanical tools such as squeegee or blade to fill and level the mold material and/or the cast material.

In this variant, the cast material, which is, for example, a metal or ceramic paste, is in liquid form, and is applied within the mold by means of a doctor blade or a squeegee and forms a thin layer. A planing process machines the hardened paste using a cutter or planer to form a smooth surface.

Prior to planing, the paste may undergo a drying process. In the drying process, part of the liquids in the paste may be removed, and it is desirable that drying is relatively quick so as not to slow down manufacture of the part.

Drying can be made by raising the temperate using, for example, hot air. However, when a methodology that involves sequential deposition of mold-cast layers, as in WO 2018/203331, is used, care should be taken to perform the drying at a temperature, time period, and other conditions that suit the process requirements. For example, a drying temperature should be lower than the typically already low melting temperature of the mold material, yet be sufficiently fast to render the AM process efficient. Moreover, high temperatures may cause thermal expansion and a resulting deformation, damage and/or other adverse effects of the object's properties.

WO 2020/044336, by the present assignee, describes a methodology which solves the problems that may arise from drying the formed layers using elevated temperatures, by teaching a methodology in which vacuum is used to assist drying and more particularly to carry out hardening of the paste or other filling used in the mold to form the layer. More particularly, at each layer the mold is formed and then filled with a paste or other substance, and then the newly filled layer surface is placed in a vacuum so that the pressure quickly falls to change the boiling points of the liquids in the layer. The liquids thus evaporate to harden the layer. After hardening, the vacuum is released, and the volume is vented.

The present inventors have designed novel formulations containing sinterable materials, which are usable as cast materials for manufacturing products, or parts thereof, containing materials such as metals, glasses and ceramics, and particularly as cast materials that are usable in additive manufacturing processes such as described in WO 2018/203331, and/or in any other manufacturing processes where cast-mold methodologies are used.

The novel formulations are designed so as to meet the (e.g., additive) manufacturing process requirements in terms of dispensability through a selected nozzle or any other dispenser, fast hardening of each layer to allow an efficient process, while at the same time be chemically compatible with process requirements of other manufacturing steps such as removal of the mold material, debinding and sintering. In some embodiments, the novel formulations are designed so as to properly adhere both to the mold material and to the previous cast layer. In some embodiments, the novel formulations are designed so as to undergo drying under reduced pressure without affecting the homogeneity and/or dimensions of the cast material (e.g., without undergoing thermal shrinkage and/or without forming defects such as blisters, craters, peels, holes, etc.). In some embodiments, the novel formulations beneficially and significantly reduce the oxidation rate of the sinterable material by providing surface protection to the powder particles, and are therefore particularly useful for powders of sinterable metals which are oxygen sensitive (e.g., feature a high oxidation rate).

The novel formulations are also usable in processes such as metal injection molding and any other processes that use sinterable materials.

The novel formulations are designed to be waterless or water-free, that is, devoid of water, as defined herein, and are also referred to herein as organic formulations.

Embodiments of the present invention relate to novel formulations containing sinterable materials, to processes utilizing these formulations as cast materials in, for example, mold-cast methodologies such as mold-cast additive manufacturing of three-dimensional objects containing metal, ceramic and/or glass materials, and to objects made using these formulations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Herein, and in the art, the phrases "mold-cast process", "mold casting process", "mold-cast method", "mold casting method", "mold-cast methodology", "mold casting methodology" and any other phrases that relate to a combination of a mold and a cast, describe a process in which a mold, typically a sacrificial mold, is formed while surrounding at least one free space, and the at least one free space is filled with a dispensable (e.g., flowable, flowing) cast material. Once the cast material is at least partially hardened, such that it is hard enough to be self-supporting and/or maintain its shape, the mold is removed. Typically, mold-cast methodologies further include an additional step of further hardening the cast material.

Herein, the phrase "mold material" describes a material used to a form a mold. When the mold material hardens during the process, this phrase relates to the hardened mold material, and the pre-hardened material that is dispensed to provide the mold material is referred to as mold material formulation. In some embodiments, the hardening of a mold material formulation does not change the chemical composition of the material, in which cases, the phrases "mold material formulation" and "mold material" are used interchangeably.

The phrase "cast material formulation" or "cast formulation" as used herein describes the material that fills the mold, before it is hardened. The phrase "cast material" describes the hardened form of the cast material formulation (e.g., in a green body, as defined herein).

The phrase "green body" as used herein describes an object formed by an additive manufacturing (AM) process that has at least a portion that only been partially hardened or solidified and requires additional hardening to obtain a fully solidified object. Typically, but not obligatory, a green body is a self-supported body that is capable of maintaining its geometrical shape. In the context of the present embodiments, the green body relates to the object prepared by AM using a mold-cast methodology, and upon removal of the mold material.

The phrase "brown body" as used herein and in the art describes an object prepared by a mold-cast process, after removal of the mold material and the binder (after debinding).

Herein throughout, the term "object" describes a product of an additive manufacturing process or a mold-cast process. The term "product" refers to a final product in which sinterable materials underwent sintering or any other process to fuse the powder materials. The product can be a final article-of-manufacturing or a part thereof.

In some of any of the embodiments described herein, in a mold-cast process, the mold is formed by an additive manufacturing process, and in some embodiments, the additive manufacturing is three-dimensional (3D) printing, for example, three-dimensional (3D) inkjet printing.

In some of any of the embodiments described herein the mold-cast process comprises a layer-be-layer formation of a mold material wherein each layer of the mold material is filled with a cast material formulation, such as described, for example, in WO 2018/203331 or WO 2020/044336 or WO 2020/129049, and is described in further detail hereinbelow.

The cast material formulation described herein can be used in any other mold-cast processes.

In some embodiments, the cast material formulation is usable in mold-cast processes in which hardening of the cast material formulation is performed under reduced pressure, as described in further detail hereinafter.

Sinterable Formulation:

According to an aspect of some embodiments of the present invention there is provided a cast material formulation. In some embodiments, the cast material formulation is usable in mold casting processes, for example, mold casting processes as described in exemplary embodiments herein.

A formulation according to the present embodiments comprises a powder of a sinterable material and an organic vehicle (also referred to herein as an organic carrier).

According to an aspect of some embodiments of the present invention there is provided a sinterable paste formulation usable as cast material in a cast-mold process in combination with a mold material formulation. According to some embodiments of the present invention, the sinterable paste formulation comprises a power of a sinterable material, as described herein in any of the respective embodiments (see, for example, Example 1 hereinafter), a binder material, as described herein in any of the respective embodiments (see, for example, Example 1 hereinafter), and an organic vehicle, as described herein in any of the respective embodiments (see, for example, Example 1 hereinafter).

According to some of any of the embodiments described herein, an amount of the powder is at least 85% by weight of the total weight of the formulation. According to some of any of the embodiments described herein, an amount of the powder is at least 87%, or 88%, or 89%, or at least 90%, at least 91% or at least 92%, by weight, of the total weight of the formulation. According to some of any of the embodiments described herein, an amount of the powder ranges from about 85 to about 95, or from about 88 to about 92, % by weight of the total weight of the formulation, including any intermediate values and subranges therebetween.

Powder of a Sinterable Material:

The powder of a sinterable material may include a powder of one or more of a metal, a ceramic and/or a glass. In some embodiments, the sinterable materials are sinterable at a temperature of at least 500° C., or at least 800° C., or at least 1000° C., so as to assure complete thermolization of the binder(s) before sintering.

By "sintering" it is meant causing a powder to from a coherent mass without melting it.

Exemplary sinterable glass materials include, but are not limited to, soda-lime-silica glasses, sodium borosilicate glasses, fused silica, and alumino-silicate glasses.

Exemplary sinterable ceramic materials include, but are not limited to, metal oxides such as titania, silica, zirconia, and alumina.

Exemplary sinterable metal materials include, but are not limited to, gold, platinum, copper, silver, zinc, aluminum, antimony, barium, beryllium, bismuth, boron, cadmium, calcium, cerium, cesium, chromium, cobalt, erbium, europium, gadolinium, gallium, germanium, hafnium, holmium, indium, iron, lanthanum, lead, lutetium, lithium, magnesium, manganese, molybdenum, neodymium, nickel, niobium, osmium, palladium, potassium, praseodymium, rhenium, rhodium, rubidium, ruthenium, samarium, scandium, silicon, sodium, strontium, tantalum, tellurium, terbium, thulium, tin, titanium, tungsten, vanadium, yttrium, ytterbium, and zirconium, including alloys containing a combination of two or more metals, such as, for example, brass, steel (e.g., stainless steel), and bronze.

In exemplary embodiments, the sinterable material is or comprises a stainless steel powder.

In exemplary embodiments, the sinterable material is or comprises a copper powder.

In exemplary embodiments, the sinterable material is or comprises a titanium powder.

In some of any of the embodiments described herein, the powder has an average particles size which is no more than 50% of the thickness of the layer formed during the AM process as described herein.

In some of any of the embodiments described herein, the average particles size (d50) is no more than 50 micrometer, or no more than 45 micrometers, or no more than 40 micrometer, or no more than 30 micrometer, or no more than 25 micrometer, or no more than 22 micrometer, or no more than 20 micrometer, or no more than 16 micrometer, or no more than 10 micrometer.

In exemplary embodiments, the average particles size (d50) ranges from 1 to about 100 micrometer, or from 1 to about 50 micrometer, or from 1 to about 20 micrometer, e.g., 5-15, or 5-10 micrometer, including any intermediate values and subranges therebetween.

According to some of any of the embodiments described herein, d50 values are as determined by laser diffraction measurements in accordance with ISO 13320.

Herein throughout, the term "micrometer" and "micron" are used interchangeably.

In some of any of the embodiments described herein, the powder is characterized by a high particles size distribution (PSD), for example, higher than commonly used for binder jet or laser beam or electron beam additive manufacturing processes. For example d(50): 10 micron, cutoff: 45 microns. Without being bound by any particular theory, it is assumed that high PSD provides higher tapped density and a more dense packaging of the particles in the printed object.

According to some of any of the embodiments described herein, the sinterable powder comprises a plurality of particles, and at least a portion, and preferably most or all of the particle are generally shaped as spherical particles.

By "at least a portion" it is meant at least 20%, at least 30%, at least 40%, and preferably at least 50% or at least 60%, of the particles. By "most" it is meant at least 70%, or at least 80%, or at least 90%, or at least 95%, or at least 98%, or at least 99%, of the particles.

Powders generally comprising spherical particles as described herein can be obtained by methods known in the art, for example, by gas atomization or water atomization.

According to exemplary embodiments, the powder comprises gas-atomized spherical particles, for example, gas-atomized metal particles. According to some of these embodiments, the average particles size (d50) of the gas-atomized spherical particles ranges from 1 to about 100 micrometer, or from 1 to about 50 micrometer, or from 1 to about 20 micrometer, e.g., 5-15, or 5-10 micrometer, including any intermediate values and subranges therebetween.

In the gas atomization process, a metal powder having a generally spherical shape, high tap density and low oxygen content is produced.

The spherical shape of particles in the sinterable powder and their relatively small size provide for a good fluidity and a high metal loading in the final product, mainly due to a higher tap density, and may further allow practicing the sintering stage at lower temperatures, thus achieving higher strengths.

In some embodiments, the formulations described herein provide high particles loading and/or high particle packing fractions which provide improved properties of the final product.

According to some of any of the embodiments of the present invention the sinterable material comprises one or more metal(s).

The methodology described herein is particularly useful when the sinterable material comprises one or more metal(s) that feature a high oxidation rate and/or a high affinity to oxygen. Such metals are also referred to herein as "oxidizable" or as "oxygen sensitive". Such metals include, for example, metals featuring relatively high oxophilicity, of at least 0.1, or of at least 0.2, or of at least 0.3, when determined based on the metal-oxygen bond enthalpy as described in Kasper P. Kepp, Inorg. Chem., 2016, 55, 9461-9470.

Organic Vehicle:

According to some of any of the embodiments described herein, the organic vehicle comprises one or more organic materials.

According to some of any of the embodiments described herein, at least one, or all, of the organic materials is/are characterized by an evaporation rate, as defined herein, of at least 0.3, or of at least 0.4, or of at least 0.5, relative to n-butyl acetate.

In some of any of the embodiments described herein, at least one of the organic materials is characterized by an evaporation rate, as defined herein, of from 0.3 to 0.9, or from 0.3 to 0.8, or from 0.3 to 0.7, relative to n-butyl acetate.

Without being bound by any particular theory, it is assumed that such a relatively low evaporation rate allows using the formulation in a mold-cast AM process as described herein, such that at least a portion of the organic vehicle does not evaporate when the formulation is dispensed, yet, it evaporates quickly upon dispensing the formulation and subjecting it, for example, to hardening under heat and/or reduced pressure as described herein.

In some embodiments, the organic vehicle comprises at least one organic material that is characterized by an evaporation rate that ranges from 0.3 to 0.8, or from about 0.3 to about 0.65.

An evaporation rate, as used herein, refers to n-butyl acetate as the reference material.

According to some of any of the embodiments described herein, the at least one organic material has an evaporation rate in a range of from 0.3 to 0.8, or from 0.3 to 0.7, or from 0.4 to 0.8, or from 0.4 to 0.7, or from 0.5 to 0.7, on an n-butyl acetate scale.

An exemplary organic material usable to form the organic vehicle is Propylene Glycol Mono Methyl Ether (PM) CAS No. 107-98-2 (evaporation rate: 0.62). Other exemplary suitable solvents include, but are not limited to, propylene glycol propyl ether (PnP), dipropylene glycol monomethyl ether (DPM), propylene glycol methyl ether acetate (PMA), and any mixture thereof.

An exemplary organic material usable to form the organic vehicle is n-butanol.

In exemplary embodiments, the organic vehicle comprises a mixture of two or more organic materials. In some of these embodiments, one of the organic materials features an evaporation rate as described hereinabove, and can be, for example, one or more of Propylene Glycol Mono Methyl Ether (PM) CAS No. 107-98-2, propylene glycol propyl ether (PnP), Dipropylene glycol monomethyl ether (DPM), Propylene Glycol Methyl Ether Acetate (PMA), and any mixture thereof; and another organic material has a high evaporation rate as described herein and can be, for example, a ketone-type or acetone-type organic material as described hereinafter, such as, for example, methyl ethyl ketone.

In exemplary embodiments, a total amount of the one or more organic materials that feature an evaporation rate that ranges from 0.3 to 0.8 as described hereinabove is at least 30%, or at least 40%, or at least 50%, by weight, of the total amount of the organic vehicle.

According to some of any of the embodiments described herein, the organic vehicle comprises at least one organic material that has an evaporation rate in a range of from 0.3 to 0.8 on an n-butyl acetate scale, as described herein, and at least one organic material that has an evaporation rate higher than 2 or higher than 3.

According to some of these embodiments, an amount of the organic material that features a low evaporation rate as described herein (e.g., an alkylene glycol) is at least 50%, by weight of the total amount of the organic vehicle.

According to some embodiments, a weight ratio of an organic material with low evaporation rate and an organic material with high evaporation rate ranges from 1:1 to 3:1, or from 1:1 to 2:1, including any intermediate values and subranges therebetween.

It is to be noted that the formulations as described herein may include as the organic material(s) that form the organic vehicle organic materials that feature evaporation rate higher than 1, higher than 2 and even higher than 3, with or without an organic material that features a low evaporation rate as described herein.

According to some of any of the embodiments described herein, the one or more organic materials that form the organic vehicle are such that vaporize at both atmospheric and reduced pressure. Preferably, the one or more organic materials that form the organic vehicle feature a boiling temperature that is lower than 190° C.

Exemplary organic materials that are usable for forming the organic vehicle include, but are not limited to, alcohols, alkanes, diols, ketones, acetates, esters, glycol ethers, glycol esters and any mixture thereof.

Exemplary alcohols that are usable in the context of the respective embodiments of the present invention include, but are not limited to, C1-C5 alcohols, such as ethanol, isopropyl alcohol, and t-butanol.

Exemplary alkanes that are usable in the context of the respective embodiments of the present invention include, but are not limited to, heptane, 2,3-dimethylbutane, 2,2-dimethylbutane, 2-methylpentane and 3-methylpentane.

Exemplary alcohols that are usable in the context of the respective embodiments of the present invention include, but are not limited to, esters of liquid C1-C10 carboxylic acids and C1-C8 alcohols such as methyl acetate, ethyl acetate, propyl acetate, n-butyl acetate, isoamyl acetate, methyl formate and 3-ethoxyl ethyl propionate.

Exemplary ketones that are usable in the context of the respective embodiments of the present invention include, but are not limited to methyl ethyl ketone (MEK), methyl propyl ketone (MPK), methyl iso-butyl ketone (MIBK), diisobutyl ketone, isophorone, ketohexamethylene and acetone.

Exemplary ethers that are usable in the context of the respective embodiments of the present invention include, but are not limited to, dimethoxymethane, diethoxyethane or diethyl ether; glycol ethers such as butoxy ethanol, butyl-diglycol, methyl carbitol, propylene glycol n-butyl ether and propylene glycol methyl ether acetate;

Additional exemplary organic materials include, for example, volatile hydrocarbon, such as C8-C16 isoalkane (isoparaffin), Fancol ID, isodecane, and the oil marketed under the trade name Isopar® or Permethyl®, and mixtures thereof, methyl formate, and Parachlorobenzotrifluoride (PCBTF).

In some of any of the embodiments described herein, the organic vehicle is such that does not chemically interact with the binder material and/or with the mold material. In some embodiments, the organic vehicle does not dissolve the mold material.

According to some of any of the embodiments described herein, the organic vehicle comprises an alkylene glycol, typically as an organic material that features a low evaporation rate as described herein, for example, an alkylene glycol having the formula:

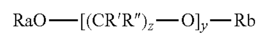

with Ra, Rb, R' and R" being each independently hydrogen, alkyl, cycloalkyl, or aryl, and with z being an integer of from 1 to 10, preferably, 2-6, more preferably 2 or 3, and y being an integer of 1 or more. Preferably R' and R" are both hydrogen. Preferably, one or both of Ra and Rb is an alkyl. When z is 2 and y is 1, this group is an ethylene glycol. When z is 3 and y is 1, this group is a propylene glycol.

According to exemplary embodiments, the organic vehicle comprises a propylene glycol, and in some embodiments it comprises a propylene glycol methyl ether.

Other organic materials having an evaporation rate as defined herein are contemplated as included in the organic vehicle.

According to exemplary embodiments, the organic vehicle comprises a mixture of an alkylene glycol as described herein and a ketone-type material, as an organic material that has high evaporation rate, for example, an acetone type material of the formula:

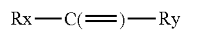

Wherein Rx and Ry are each independently an alkyl, preferably a lower alkyl of 1-6, or 1-4, carbon atoms on length.

In some embodiments, one of Rx and Ry is methyl and the other is ethyl, propyl, or butyl.

According to some of any of the embodiments described herein, the organic vehicle comprises an alkylene glycol.

According to some of any of the embodiments described herein, the organic vehicle comprises a mixture of an alkylene glycol and a ketone, as described herein.

According to some of any of the embodiments described herein, a total amount of the organic vehicle ranges from 3 to 10, or from 4 to 10, % by weight of the total weight of the formulation.

According to some of any of the embodiments described herein, a total amount of the organic vehicle ranges from 3 to 10, or from 4 to 10, or from 4 to 8, or from 4 to 7, % by weight of the total weight of the formulation, including any intermediate values and subranges therebetween.

Binder Material:

According to some of any of the embodiments described herein, the formulation further comprises a binder material.

By "binder material" it is meant a curable material, which can be cured (hardened) when exposed to heat or other curing energy or to a curing condition such as, for example, pH change. A binder material typically comprises one or more polymerizable material(s) and/or one or more polymeric material(s) which can undergo further polymerization (e.g., chain elongation) and/or cross-linking when exposed to a curing condition (e.g., curing energy such as heat) to thereby provide a hardened material.

According to some of any of the embodiments described herein, the organic vehicle and the binder material are selected such that the binder material is dissolvable and/or dispersible in the organic vehicle.

By "dissolvable or dispersible" it is meant that no more than 30%, or no more than 20%, or no more than 10%, by weight of the binder material, precipitate when mixed with the organic vehicle.

According to some of any of the embodiments described herein, the organic vehicle and the binder material are selected as chemically inert to one another, that is, the organic vehicle and the binder material do not react chemically react with one another when in contact, for example, when contacted with one another at room temperature and/or at conditions used in a mold-cast process as described herein (prior to debinding). According to some of any of the embodiments described herein, the organic vehicle and the binder material are selected as capable of physically interacting with one another.

According to some of any of the embodiments described herein, an amount of the binder material is no more than 10%, or no more than 5%, or no more than 3%, or no more than 2%, by weight of the total weight of the formulation.

In some embodiments, an amount of the binder material ranges from 0.8 to 2% by weight of the total weight of the formulation, including any intermediate values and subranges therebetween.

In some embodiments of the present invention, the binder material comprises a polymeric material (e.g., polymeric acrylic materials).

According to some of any of the embodiments described herein, the binder material is selected so as to exhibit one or more, preferably two or more, and preferably all, of the following properties:

- Low volume shrinkage (e.g., lower than 1%) when subjected to reduced pressure;
- Low tendency to form film, e.g., a film forming temperature (TMF) higher than 5° C. or higher than 10° C., or higher than a temperature used when hardening the cast material is performed (e.g., under vacuum);
- Tg of at least 25° C., or at least 30° C. or at least 40° C., or from 25 to 150° C., or from 25 to 100° C., or from 25 to 80° C., or from 30 to 150° C., or from 30 to 100° C., or from 30 to 80° C. (for each binder included in the binder material);
- Thermolizability at a temperature lower than a sintering temperature of the sinterable material, e.g., lower than 1000° C., preferably lower than 600° C., or lower than 500° C., but higher than a melting temperature of the mold material.

According to some of any of the embodiments described herein, one or more, preferably all, of the binder material independently features a glass transition temperature (Tg) of at least 25° C. According to some of any of the embodiments described herein, one or more, preferably all, of the binder material independently features a glass transition temperature (Tg) that ranges from 25 to 150° C., including any intermediate values and subranges therebetween.

In some embodiments, the binder material comprises two or more different materials, each providing to the formulation one or more of the above properties. For example, one binder material can feature a high Tg, one binder material can feature high TMF, etc., such that the selected combination of binder materials and the relative amounts thereof provide the desired properties as defined herein for a binder material.

In exemplary embodiments, the binder comprises two or more binder materials.

In some of any of the embodiments described herein, the binder material or mixture of binder materials are selected so as to impart to the cast material properties such as stiffness, uniformity, resistance to crack formation during the hardening step and subsequent steps if performed, resistance to solvents used to remove the mold material.

In some of any of the embodiments described herein, one or more of the binder materials is, or each independently is, a (meth)acrylic polymer, poly-(meth)acrylic polymer or a styrene-acrylic copolymer.

In some of any of the embodiments described herein, one or more, or all, of the binder materials is dissolvable or is at least dispersible in the organic vehicle included in the formulation, at room temperature or at the working (jetting) temperature.

In some of any of the embodiments described herein, one or more, or all, of the binder materials, are solid at room temperature.

According to some of any of the embodiments described herein, the binder material is not in a form of an emulsion.

According to some of any of the embodiments described herein, the binder material is devoid of water.

According to some of any of the embodiments described herein, the binder material is thermolizable at a temperature lower by at least 100° C. than a sintering temperature of the sinterable material, so as to assure complete thermalization of the binder material during the debinding stage and/or to assure that no binder material remains when the brown body is subjected to sintering.

According to some of any of the embodiments described herein, the binder material remains intact when subjected to a condition under which the mold material is removed. For example, the binder material is non-dissolvable when contacted with an organic solvent that dissolves the mold material and/or at a melting temperature of the mold material.

According to some of any of the embodiments described herein, a volume shrinkage of the binder material when subjected to reduced pressure of about 5 mbars is less than 1%.

According to some of any of the embodiments described herein, the binder material has an (e.g., average) Tg of at least 30° C., or of at least 40° C.

According to some of any of the embodiments described herein, the binder material comprises a mixture of two or more binders, and a Tg of each of these binders ranges from 30 to 80° C.

According to some of any of the embodiments described herein, the binder material is characterized by a film forming temperature (TMF) of at least 0° C., or at least 5° C. or of at least 10° C. In some embodiments the TMF is in a range of from 0 to 10° C. In some embodiments, the TMF does not exceed the temperature at which the organic vehicle evaporates under reduced pressure.

In some of any of the embodiments described herein, the binder is or comprises a (meth)acrylic polymer, that is an acrylic and/or methacrylic polymer or co-polymer. An acrylic copolymer can be, for example, a co-polymer comprising acrylic/methacrylic backbone units and aromatic backbone units such as styrene backbone units.

Exemplary materials suitable for use as a binder material include, but are not limited to, solid binders, typically including acrylic and/or methacrylic polymers and/or copolymers, such as those marketed under the tradenames NeoCryl B-817, Neocryl-B-842, and Joncryl® 682. Additional exemplary binder materials include, but are not limited to, ethyl cellulose polymers (such as marketed under the trade name Etocel® Dupont), Cellulose Acetate Butyrate polymers (such as marketed as CAB, by Eastman), Polyvinyl butyral polymers (such as marketed under the trade name Butvar® by Eastman), Poly vinyl pyrrolidone polymers (such as marketed by Ashalnd), poly(methyl methacrylate) and copolymers thereof, polymethacrylate and copolymers thereof, poly(ethyl methacrylate) and copolymers thereof, poly(butyl methacrylate) and copolymers thereof, poly (isobutyl methacrylate) and copolymers thereof (such as marketed under the tradename Elvacite® by Lucite; or Paraloid® by Dow), polystyrene maleic anhydride and copolymers thereof (such as marketed under the trade name SMA® by Cray Valley), Urea-aldehyde resins (such as marketed under the tradename Laropal® by BASF), Sucrose Acetate Iso-butyrate polymers (such as marketed under SAIB® by Eastman) and Nitrocellulose polymers (such as marketed by Hagedorn, Germany).

Additional Agents:

A formulation as described herein beneficially comprises one or more additional agents such as one or more of a surfactant, a dispersant, a thickening agent (thickener), a rheology modifier, a pigment, a dye, etc.

Non-limiting examples of suitable thickening agents include ethyl cellulose of various molecular weights, cellulose derivatives, nanocrystalline cellulose or fibers, polyvinylpyrrolidone (PVP) of various molecular weights, polyacrylates, polymethacrylate or any other copolymers of acrylic acids.

Exemplary materials suitable for use a thickening agent (a thickener) include, but are not limited to, polymeric materials that are soluble in organic solvents, and which preferably, but not obligatory, can further act as a co-binder, for example, by exhibiting good adhesion to metals, wax materials, and the like. A non-limiting example a suitable thickening agent is a material marketed under the trade name Mowital® B 60 H by Kuraray (a polyvinyl butyral) or similar commercially available materials.

Non-limiting examples of suitable rheology modifiers include polyvinyl butyral (Mowital®), sodium carboxymethyl cellulose (Vivistar®), polyamide resin (Eurelon®), swelled polyacrylate (Rheolate®), polyether urea-polyurethane, polyether-polyol, and the like.

Exemplary materials suitable for use as a dispersant (a dispersing agent) include materials suitable for use with inorganic materials such as the metal powders described herein, in an organic medium. Suitable materials are in a form solid particles, with or without an organic medium. An exemplary dispersing agent comprises an anionic aliphatic ester, such as, for example, a material marketed under the tradename Efka® FA 4673.

Exemplary suitable dispersants include materials capable of promoting the formation and stabilization of the formulation of the invention, prior to application. Representative examples include, without limitation, polycarboxylic acid esters, unsaturated polyamides, polycarboxylic acids, alkyl amine salts of polycarboxylic acids, polyacrylate dispersants, polyethyleneimine dispersants, and polyurethane dispersants.

Additional examples of suitable dispersing agents include those marketed under the following trade names: DisperBYK® 103, DisperBYK® 106, DisperBYK® 108, DisperBYK® 110, DisperBYK® 111, DisperBYK® 112, DisperBYK® 116, DisperBYK® 118, DisperBYK® 180, Anti-Terra® U-100, Bykuman to name few. Other examples are Solsperse® 32500, Solsperse® 35000, Solsperse® 32500, Solsperse® 32500 (Lubrizol) and Dispex® Ultra FA 4431, Dispex® Ultra FA 4437, Dispex® Ultra FA 4480, Dispex® Ultra FA 4483, Dispex® Ultra PA 4510, Dispex® Ultra PA 4530, and/or Dispex® Ultra PA 4550 (BASF).

According to some embodiments, the dispersing agent, or dispersant, has a high affinity to the sinterable material (e.g., the sinterable metal particles), such that it interacts with the particles' surface and protect it from oxidation.

Surfactants usable in the context of the present embodiments can be ionic, non-ionic or zwitterionic.

Exemplary surfactants are cationic surfactants such as, but not limited to, didodecyldimethylammonium bromide (DDAB), CTAB, CTAC cetyl (hydroxyethyl) (dimethyl) ammonium bromide, N,N-dimethyl-N-cetyl-N-(2-hydroxyethyl) ammonium chloride, anionic surfactants such as sodium dodecyl sulfate (SDS) and various unsaturated long-chain carboxylates, ethoxylation products of lauryl, tridecyl, oleyl, and stearyl alcohols; alkyl phenol polyglycol ethers, and octa-glycol sulfonates; sulfosuccinate salts, e.g., disodium ethoxylated nonylphenol ester of sulfosuccinic acid, disodium n-octyldecyl sulfosuccinate, sodium dioctyl sulfosuccinate, and the like.

Exemplary Formulations, Properties and Preparation:

According to some embodiments of the present invention, there is provided a cast material formulation, as described in Example 1 in the Examples section that follows.

A cast material formulation as described herein throughout is also referred to herein as a sinterable paste formulation or simply as a sinterable formulation.

According to some embodiments of the present invention, there is provided a cast material formulation comprising, or consisting of, the materials/components presented in Example 1 or in Tables 1, 2 and 3 and accompanying description.

According to some of any of the embodiments described herein, the formulation exhibits a viscosity of in a range of from 10000 to 200000, centipoises, including any intermediate values and subranges therebetween.

According to some of any of the embodiments described herein, the formulation exhibits a shear-thinning behavior at atmospheric pressure.

According to some of any of the embodiments described herein, the formulation is designed such that is features no shear-thinning behavior under reduced pressure of 5 mBar or 10 mBar.

Herein throughout, the term "shear-thinning" describes a property of a fluidic compound or a material that that is reflected by a decrease in its viscosity (increase in its fluidity) upon application of shear forces (under shear strain). In some of the present embodiments, a shear-thinning formulation is such that exhibits a significant, e.g., at least 100%, reduction in its Shear modulus upon increasing the shear strain from about 1% to above 50%.

According to some embodiments of the present invention, there is provided a process of preparing a cast material formulation as described herein in any of the respective embodiments, which comprises mixing the binder material, the organic vehicle and the powder at room temperature. An exemplary such process in described in the Examples section that follows. The formulation of the present embodiments is prepared by mixing the components as described herein, preferably, but not obligatory, at room temperature.

According to some of any of the embodiments described herein, the formulation comprises:

from 85 to 95% by weight of the powder of the sinterable material, as described herein in any of the respective embodiments;

from 4 to 10% by weight of an organic vehicle, as described herein in any of the respective embodiments; and from 0.5 to 2% by weight of the binder material, as described herein in any of the respective embodiments.

According to some of these exemplary embodiments, the binder material comprises one or more acrylic polymers such as, for example, one or more of a polyvinyl butyral and a poly(isopropyl) methacrylate.

According to some of any of these exemplary embodiments, the formulation further comprises a dispersant, preferably one or more those marketed under the following trade names: DisperBYK® 103, DisperBYK® 106, DisperBYK® 108, DisperBYK® 110, DisperBYK® 111, DisperBYK® 112, DisperBYK® 116, DisperBYK® 118, DisperBYK® 180, Anti-Terra® U-100, Bykuman to name few. Other examples are Solsperse® 32500, Solsperse® 35000, Solsperse® 32500, Solsperse® 32500 (Lubrizol) and Dispex® Ultra FA 4431, Dispex® Ultra FA 4437, Dispex® Ultra FA 4480, Dispex® Ultra FA 4483, Dispex® Ultra PA 4510, Dispex® Ultra PA 4530, and/or Dispex® Ultra PA 4550 (BASF). The amount of the dispersant(s) ranges from 0.1-1%, or 0.2-0.8% by weight of the total weight of the formulation.

According to some of any of these exemplary embodiments, the formulation further comprises a thickening agent, for example, ethyl cellulose. The amount of the thickening agent ranges from 0.1-1, or from 0.1-0.8, or from 0.1-0.5, % by weight of the total weight of the formulation.

According to some embodiments of the present invention there is provided a cast material formulation that comprises a powder of a sinterable material as described herein in any of the respective embodiments, in an amount of at least 85% by weight of the total weight of the formulation, an organic vehicle, as described herein in any of the respective embodiments and any combination thereof, and one or more polymeric materials that act as a binder, a thickening agent or both.

Exemplary polymeric materials that are usable in the context of the present embodiments, include, without limitation, one or more of ethyl cellulose polymers, cellulose Acetate Butyrate polymers, Polyvinyl butyral polymers, Poly vinyl pyrrolidone polymers, Methyl methacrylate and copolymer resins, Methacrylate copolymers resins, Ethyl Methacrylate resins, Butyl and isobutyl Methacrylate resins and copolymer resins, Polystyrene maleic anhydride and copolymers, Urea and melamine formaldehyde resins, Sucrose Acetate Iso-butyrate polymers, and Nitrocellulose polymers, as these are described herein. In some embodiments, the polymeric material features Tg and/or MFT as described herein in any of the respective embodiments.

According to some of these embodiments, the powder of the sinterable material is included in an amount of from 85 to 95% by weight, as described herein in any of the respective embodiments;

According to some of any of these embodiments, an amount of the organic vehicle is from 4 to 10% by weight, as described herein in any of the respective embodiments.

According to some of any of these embodiments, an amount of the polymeric material ranges from 0.1 to 2, or from 0.4 to 2, or from 0.4 to 1.6, %, by weight of the total weight of the formulation, including any intermediate values and subranges therebetween.

According to some of any of these embodiments, the sinterable material is a metal, as described herein, and in some embodiments, it is an oxygen-sensitive metal.

According to some of any of these embodiments, the formulation further comprises a dispersant as described herein in any of the respective embodiments.

Mold Formulation and Kits:

The cast material formulation of the present embodiments is intended for use in combination with a mold material formulation, or a mold formulation, in a mold-cast process as described herein.

According to some of any of the embodiments described herein, the mold material formulation, or the mold material, comprises a saturated and/or unsaturated hydrocarbon of at least 20 carbon atoms. In some embodiments, the hydrocarbon consists of carbon and hydrogen atoms. In some embodiments, the hydrocarbon is 30, 32, 34, 36, 38, 40, or more carbon atoms in length.

An exemplary mold material is a wax, for example, a mineral wax which comprises a polyolefin or a mixture of polyolefines, optionally in combination with oxidized wax and/or micronized wax. Any other wax material that exhibits a melting temperature as described herein, and any of the other desirable/required features as described herein is contemplated.

According to some embodiments of the present invention there is provided a kit comprising a cast material formulation as described herein in any of the respective embodiments and any combination thereof, and a mold material formulation as described herein in any of the respective embodiments. The cast and model formulations are packaged individually within the kit.

According to some embodiments of the present invention there is provided a kit comprising a cast material formulation as described herein in any of the respective embodiments, and instructions to use the formulation in a process as described herein in any of the respective embodiments. In some embodiments, the kit comprises instructions to use the formulation with a mold material formulation as described herein in any of the respective embodiments.

Cast Material:

According to an aspect of some embodiments of the present invention there is provided a cast material formed of a cast material formulation as described herein. In some embodiments, the cast material is formed upon evaporation of at least a portion of the organic vehicle.

By "at least a portion" it is meant at least 20%, or at least 30%, preferably at least 40%, or at least 50%, or at least 60%, or at least 70%, or at least 80%, or at least 90%, or even 100% of the organic vehicle.

In some of any of the embodiments described herein, the cast material comprises the sinterable material power and the binder material and, if present in the formulation, further comprises a dispersant, and/or a rheology modifying agent (a thickening agent).

In some of any of the embodiments described herein, the cast material comprises at least 95%, or at least 97%, by weight, of the sinterable material, e.g., from about 95% to about 99%, or from about 97% to about 99%, with the remaining components of the cast material being the binder material and one or more of the additional components, if present in the formulation.

In some of any of the embodiments described herein, the cast material is obtained upon removal of the organic vehicle under reduced pressure (vacuum) as defined herein.

In some of any of the embodiments described herein, the cast material is obtained upon subjecting the formulation to conditions at which at least a portion, as defined herein, of the organic vehicle, is removed from the formulation.

According to some embodiments, these conditions comprise application of warm air. According to some embodiments, these conditions comprise subjecting the formulation to reduced pressure. According to some embodiments, these conditions include application of warm air, e.g., as described herein, and subjecting to reduced pressure, preferably but not obligatory subsequent to the warm air application.

Conditions at which application of warm air and subjecting to reduced pressure are performed are described in further detail hereinafter.

Mold-Casting Process:

According to an aspect of some embodiments of the present invention, there are provided processes of additive manufacturing an object (e.g., a three-dimensional object) which comprises, or consists of, a sintered material, which utilize a cast material formulation as described herein.

According to some embodiments of the present invention, the additive manufacturing is or comprises a mold casting process, as described herein.

The general method used involves:

a) printing a first mold to define one layer of the object;
b) filling the first mold with a cast material formulation as described herein in any of the respective embodiments, and thus forming a first layer of the object;
c) printing a second mold on top of the first layer to define a second layer; and
d) filling the second mold, over the first layer, with a cast material formulation as described herein in any of the respective embodiments, to form a second layer.

The process continues with alternate mold printing and casting until a molded layered object is formed.

Hereinafter, whenever a "paste" or a "cast material" is referred to, it includes a cast material formulation according to the present embodiments, and as described herein in any of the respective embodiments.

In some embodiments, a sealing hood is provided at the printing location and initially opens to a first position allowing paste to be applied within the mold and then closes to provide an airtight seal around the mold and the paste applied within the mold. Then a vacuum source evacuates air from the sealing hood in its closed position, and thus applies a vacuum to the paste. The vacuum removes liquids from the paste, and thus hardens the paste.

Removal of the mold material, to thereby obtain a green body, and thereafter removal of the binder, to thereby obtain the brown body, are then performed. Sintering can then be applied to thereby provide the final object which contains or consists of a sintered material.

The final object can be a product per se or a product part.

An additional method is provided for dealing with irregular shapes when sintering is required. A support component is printed, having a shape complementary to the product or part, in an associated process, also using additive manufacturing methodology as defined herein. The support component supports the object during sintering by fitting the object into the complementary shape prior to placing in the furnace for sintering.

FIG. 1A is a simplified flow chart showing a method of manufacturing a molded layered object according to some of the present embodiments. A first box 10 indicates printing a first mold to define one layer of the object, by, for example, dispensing a mold material formulation as described herein in a configured pattern according to the final shape of the object. The mold may be printed using known Additive Manufacturing technology, as discussed herein. Box 12 indicates pouring a cast material formulation (e.g., as described herein in any of the respective embodiments) to fill the mold printed in box 10. The cast material may then form a first layer of the eventual molded layered object.

In box 14 a second layer mold is then printed on the first layer and/or on the first molding layer. In some cases the second layer is smaller than the first layer in at least one dimension, so that the second layer mold is deposited on the cast part of the first layer. As will be discussed in greater detail below, the cast layer may be hardened to support the printing, or printing of the second layer mold may wait until the first layer is sufficiently dry, or hardened to support the second layer mold.

In box 16 a cast material formulation (e.g., as described herein in any of the respective embodiments) is poured into the second layer mold to form the second layer of the object. As shown in box 18, the procedure is repeated as often as necessary to form a molded layered object with the requisite number of layers. It will be appreciated that different layers may be of different thicknesses. Different layers may form using same or different cast material formulations. Different cast material formulations can differ from one another by, for example, the type and/or particle size and particle size distribution of the sinterable material, the type of one or more of the binder materials, and/or the type and/or amount of the organic solvent as described herein.

After pouring, the new surfaces of the cast layers may optionally be finished or polished with finishing tools as shown in 20 and 22.

The molds may be printed using any standard mold printing material that is strong enough to hold the casting material at casting temperatures and other casting conditions. Any standard 3D printing technique, such as fused deposition modeling (FDM) or Inkjet printing (e.g. 3D inkjet printing), may be used to print the mold.

In some embodiments, the mold material has a melting point temperature which is lower than a melting point of the cast material, so that heating can be used to clean away the mold once the printed object is ready.

In some embodiments the tendency may be for the process to heat up beyond a desired temperature. Thus cooling processes may be used, such as using air flow.

Hardening of the cast material formulation may include evaporation or activation reactions including energy curing, say thermosetting, or UV curing and the like. IR, microwave or UV irradiation may be used as well as blowing with warm/hot air.

The layered object obtained by the AM method may then be heated to melt the mold material, or may be immersed in a solvent to dissolve the mold material, and then may be immersed in a solvent to leaching out part of the additives and may be heated to a higher temperature to remove the binders and also may be further sintered to fuse the powder and may even be subjected to other common thermal processes such as HIP (Hot Isotropic Pressure).

Thus the present embodiments may provide a way to make molded objects containing sinterable materials.

In some embodiments, the mold and cast materials are selected such that the cast material is immiscible in the mold material and vice versa. In exemplary embodiments, the cast material formulation is an organic-based formulation as described herein, and the mold material is a hydrophobic material, such as a wax or other long-chain hydrocarbon, as described herein.

In some of any of the embodiments described herein, the cast material formulation of the present embodiments (the paste) has rheological properties to able to flow and fill the mold from one side and to properly lay to the deposited mold materials at the mold interface surface.

A mold design approach may allow a decrease in the load of the mold material over the slip cast material. Engineering of the design process may ensure that the weight of the deposited mold materials is divided over an area as large as possible so as to support the structure.

In embodiments, the mold material may have a viscosity which is higher than the viscosity of the cast material, so that the mold remains intact when the cast material is poured in. The cast material may have good wetting to properly fill the mold.

In embodiments, the cast material formulation may have low viscosity at room temperature and good wetting ability of the mold material. The cast material formulation may be capable of being hardened after deposition by exposure to a curing condition, as described herein. Using formation of a layered object as described herein, in AM process, a product may be built with strong layered bonding without mechanical or chemical defects.

Casting or pouring may be carried out at an elevated temperature, with tight control of materials to provide the mechanical properties necessary. Pouring may use a liquid dispensing system that consists of a dispensing control unit. The quantity of filling material may be set according to Sub Mold parameters such as volume, overflow factor, etc. Then the cast material may be leveled by mechanical means such as a squeegee or blade or under its own self leveling property with an optional vibrating procedure.

Later on, the Sub Molds, that is the molds of the individual layers, may be removed by exposing the assembly to a higher temperature, or using a chemical dissolving process say with an acid or by immersion in solvent to dissolve the mold material or other processes. Suitable temperatures in the case of a wax based mold may be in the range of 50-250° C.

A debinding and sintering stage may involve increasing the temperature to allow debinding and sintering of the active part of the cast material, and typical temperatures for de binding and sintering are in the range of 200° C.-1800° C. depending on the exact material and required mechanical properties of the final product.

According to a proposed process according to the present embodiments, a paste cast material is cast under high shear force and under controlled temperature. The paste cast material in this embodiment may be deposited over the previous layer of cast material that was cast at high viscosity, hardness and may be at a lower temperature.

Drying, debinding and sintering may be carried out in ovens, which may be integrated in a single device or may be provided separately.

A process according to FIG. 1A is now considered in greater detail.

The process may use a cast material formulation and a mold material formulation. The mold material formulation may for example be any material that freezes below 300° C. and has a sharp melting point, such as mineral wax. The molding material may be applied by any controlled additive manufacturing tool such as FDM or Inkjet technology as discussed above, and is therefore selected from materials suitable for such processes.

Figure 1B:
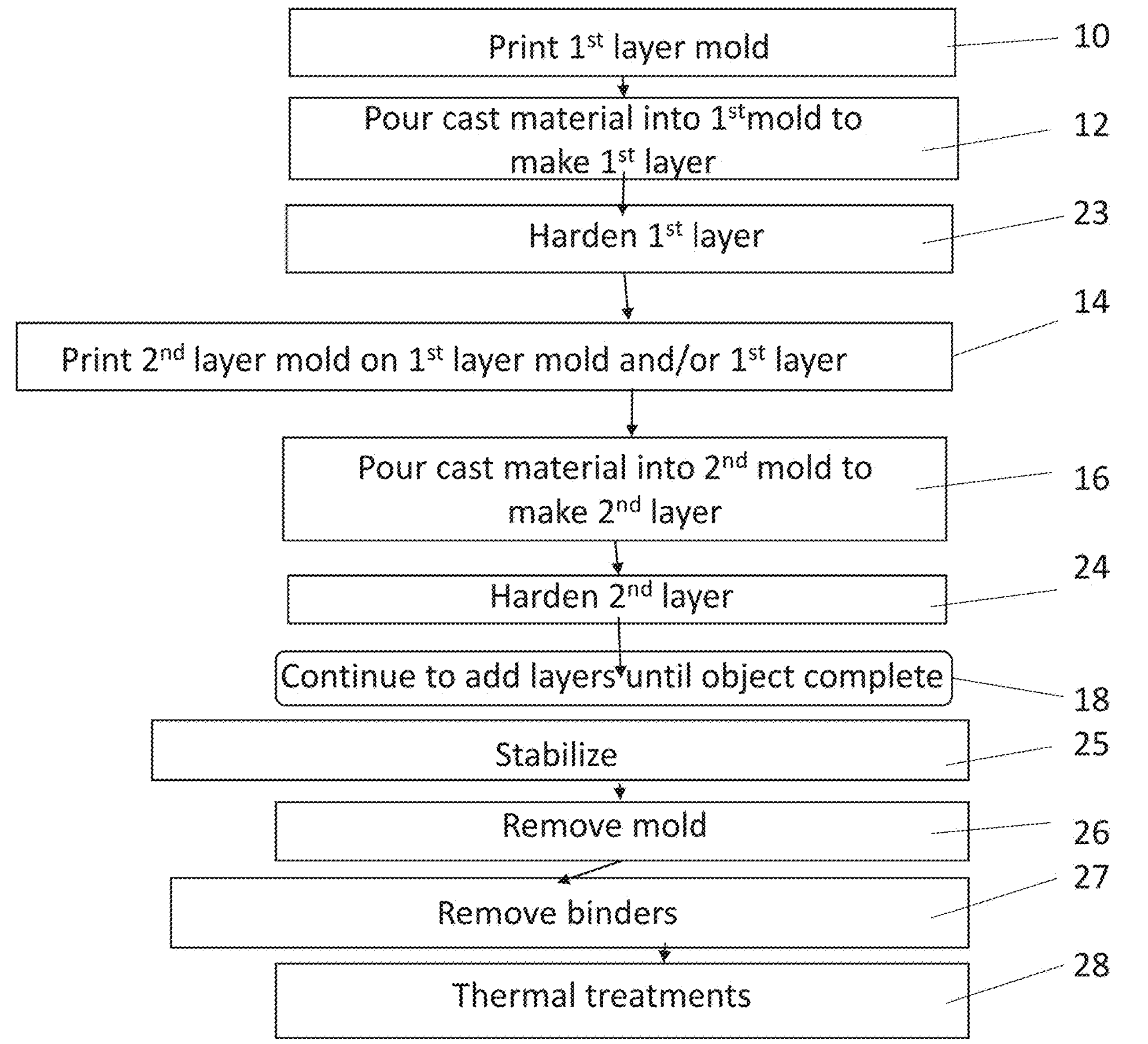
FIG. 1B is a simplified flow chart showing a more detailed embodiment of the procedure of FIG. 1A.

Referring now to FIG. 1B, and the process comprises as in box 10, building of the mold, in which 3D printing may use any of: mineral wax featuring a melting temperature of at least 60° C., UV/EB cured acrylic, methacrylic, thermally cured epoxy, polyurethane etc., to form the mold parts. Preferably, the mold material is a wax as described herein.

A tray is placed in position and the first layer mold sub part is built on the tray.

The mold is then filled 12 with the cast material formulation (e.g., a paste as described herein). The cast material may be poured, or may in embodiments be injected, under a high shear force into the mold to ensure intimate contact with the mold walls, thereby to ensure proper and complete filling of the mold. The mold itself may be mechanically strong enough to cope with the injection forces.

The now formed (n−1) layer provides a base for the next, the $n^{th}$, layer.

Solidifying or hardening 23 the cast material slurry or paste may be needed to render the layer capable of bearing the load of the subsequent layer of mold material. In other cases the viscosity of the layer already formed may be sufficient. Solidifying or hardening of the cast material formulation may be achieved by using varying means, depending on the component of the formulation. The following lists exemplary means.

Subjecting the cast material formulation to a curing condition at which polymerization and/or cross linking of a binder occurs;

Subjecting the cast material formulation to a temperature at which at least one of its components solidifies; and/or Evaporating at least a portion of the liquid carrier (e.g., an organic vehicle as described herein) to thereby harden the paste formulation.

The process then continues by printing the next mold layer 14.

The second mold layer may be printed on the surface of the previously cast paste material and may also be built over mold material from the previous layer.

The next stage is to fill the second mold layer, in a similar manner to that carried out for the first layer—16. Solidifying 24 may also be provided as needed.

For each additional layer needed in the product, the stages of hardening, printing and filling are repeated—18.

The hardened casting material paste in the shape of the final object, is now embedded in the Sub Molds.

The final object may now be stabilized 25. While stopping the shear forces, the slurry or paste may start hardening, thus developing green strength to the cast material. Green strength is the mechanical strength which may be imparted to a compacted powder in order for the powder to withstand mechanical operations to which it is subjected before sintering, without damaging its fine details and sharp edges.

The mold material may then be removed—26. Removal may involve heating the product and mold up to the melting point of the mold so that the mold material liquidizes and can be collected for re-use. Alternatively the mold may be removed by chemical dissolution in a suitable organic solvent that dissolves the mold material, such as described herein.

In all mold and sub mold parts production a sink for collecting melted mold material, such as mineral wax, for reuse may be provided.

Once the mold has been removed and a green body as defined herein in obtained then sacrificial materials (e.g., binder materials) of the paste are removed—27, for example by decomposing the sacrificial materials, by controllably heating to the optimal temp.

After the sacrificial materials are removed, the powder of the active material may be fused into solid form (e.g., sintered). A thermal treatment—box 27—such as sintering, may be applied to obtain the desired final properties for the product. As mentioned above, exemplary temperatures between 400° C. and 1800° C. may be used, and in particular temperatures exceeding 500° C.

A variation of the above method is based on applying a vacuum to facilitate hardening of the part during the manufacturing process.

At a lower near-vacuum pressure of 20 mbar, the boiling point of volatile components such as included in the organic vehicle is lowered. The reduced pressure may also draw out the liquids that remain in the paste and mold. Hence, the effect of a vacuum on hardening of a paste is not merely actual drying but also the removal of the trapped liquids.

Based on the above, an embodiment of the present invention involves firstly forming a layer, for example by printing a mold and then filling the mold with a paste. The building part layer may then be heated with hot air, say for 30 seconds, at 45° C.

Following heating, the layer is capped with a vacuum hood that forms a vacuum seal around the layer. The seal may generally extend around the rest of the part insofar as it has been manufactured. The volume within the hood is then pumped to provide a suitable level of vacuum, for example at a pressure level of around 1 mbar and the low pressure is then held for a predetermined amount of time, say 30 seconds.

Finally, the volume is vented to atmospheric pressure.

The first, heating, stage may excite the part surface to increase the energy of the liquid molecules, generally organic materials as included in the organic vehicle.

In embodiments, cycles of heating followed by vacuum may be used. In further embodiments, the venting to release the vacuum may be carried out using warmed air.

A possible apparatus for carrying out the above method for hardening a paste within walls of a mold, may comprise a sealing hood that opens to a first position allowing paste to be applied within the mold and then closes to provide an airtight seal around the mold and the paste applied within the mold. Then a vacuum source evacuates air from the sealing hood in its closed position to apply a vacuum to the paste. The vacuum removes liquids (e.g., the organic vehicle) from the paste, and thus hardens the paste.

Figure 2:
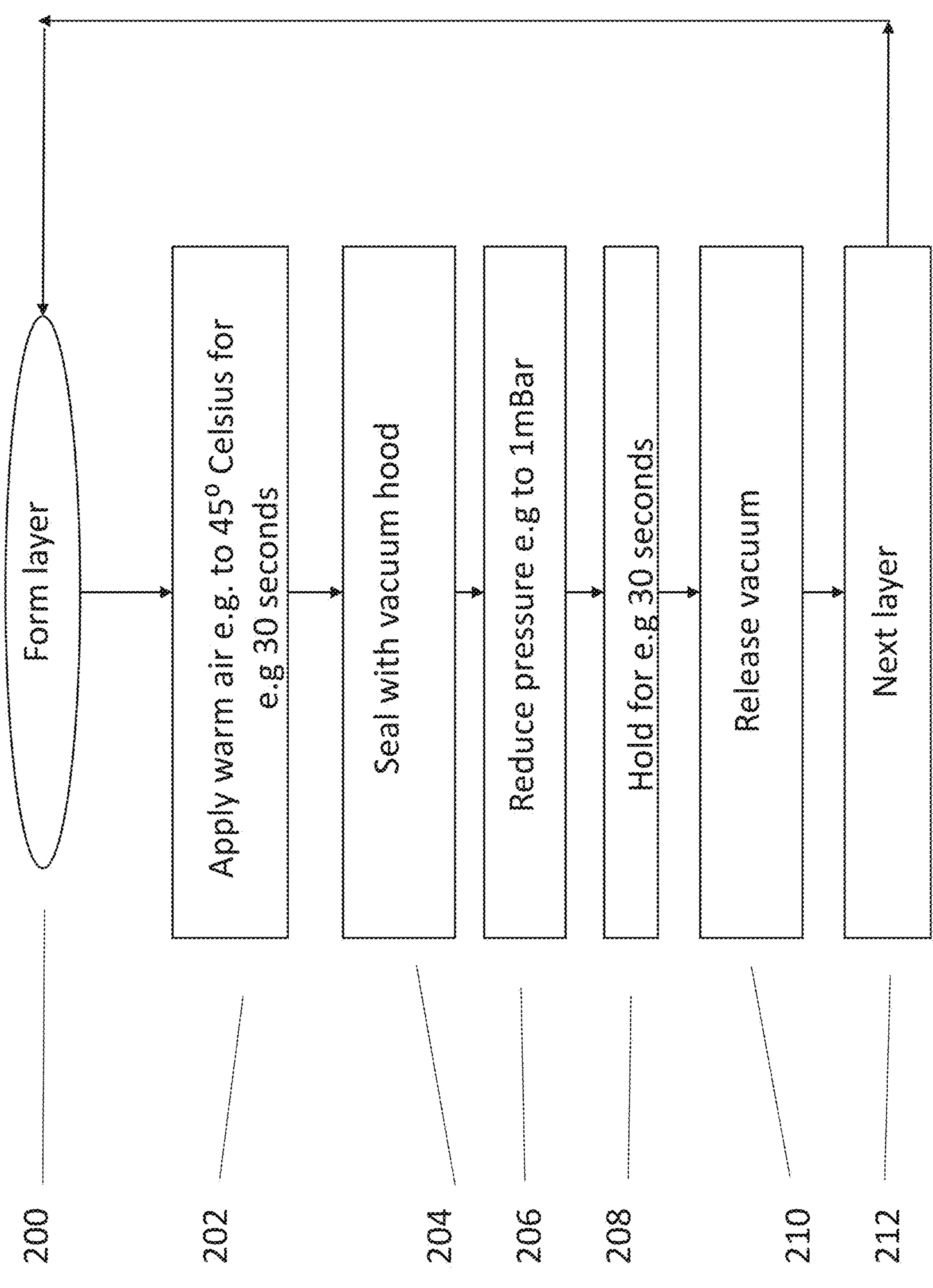
FIG. 2 is a simplified flow chart illustrating a procedure for hardening a layer formed from a paste spread into a mold according to an exemplary embodiment of the present invention.

FIG. 2 is a simplified flow chart showing a method of manufacturing a molded layered object. A first layer is formed using a paste-box 200. As will be explained below, in embodiments a mold may be printed enclosing an area which is to be filled by paste and the paste is spread within the printed mold to form the layer. Other methods to form a layer from a paste may be used.

As shown in box 202 there is an optional stage of heating the layer. For example warm air may be blown onto the newly formed layer. Heating is optional because hardening using a vacuum works even without prior heating of the paste. However the use of heating may improve evaporation rate efficiency. The mold is typically made of a low melting point material, or alternatively of an easily soluble material, for easy removal subsequent to printing. Thus heating may be limited to temperatures that are below the mold melting temperature, say kept at 20° Celsius below the melting temperature. Thus for example if the mold melting temperature is 80° Celsius then heating may be limited to 60° C. If warm air is used for heating then the warm air is kept at least slightly below the melting temperature of the mold material.

Subsequently the newly formed layer may be sealed into an airtight chamber, for example by closing a vacuum hood over the emerging structure of the part or product being formed-box 204.

A vacuum may then be applied to the layer for a preset amount of time to harden the paste. The vacuum needs to be enough to cause liquid within the paste to boil at the current temperature.

The vacuum may be released and the vacuum hood removed, as per box 210.

The process may be continued 212 with the printing of successive additional layers, each over a preceding layer. For each layer a mold is printed and filled with cast material paste formulation according to the present embodiments. The layer is sealed. The vacuum is applied, held for the required time and then released, and eventually a molded layered product or part may result.

Figure 4:
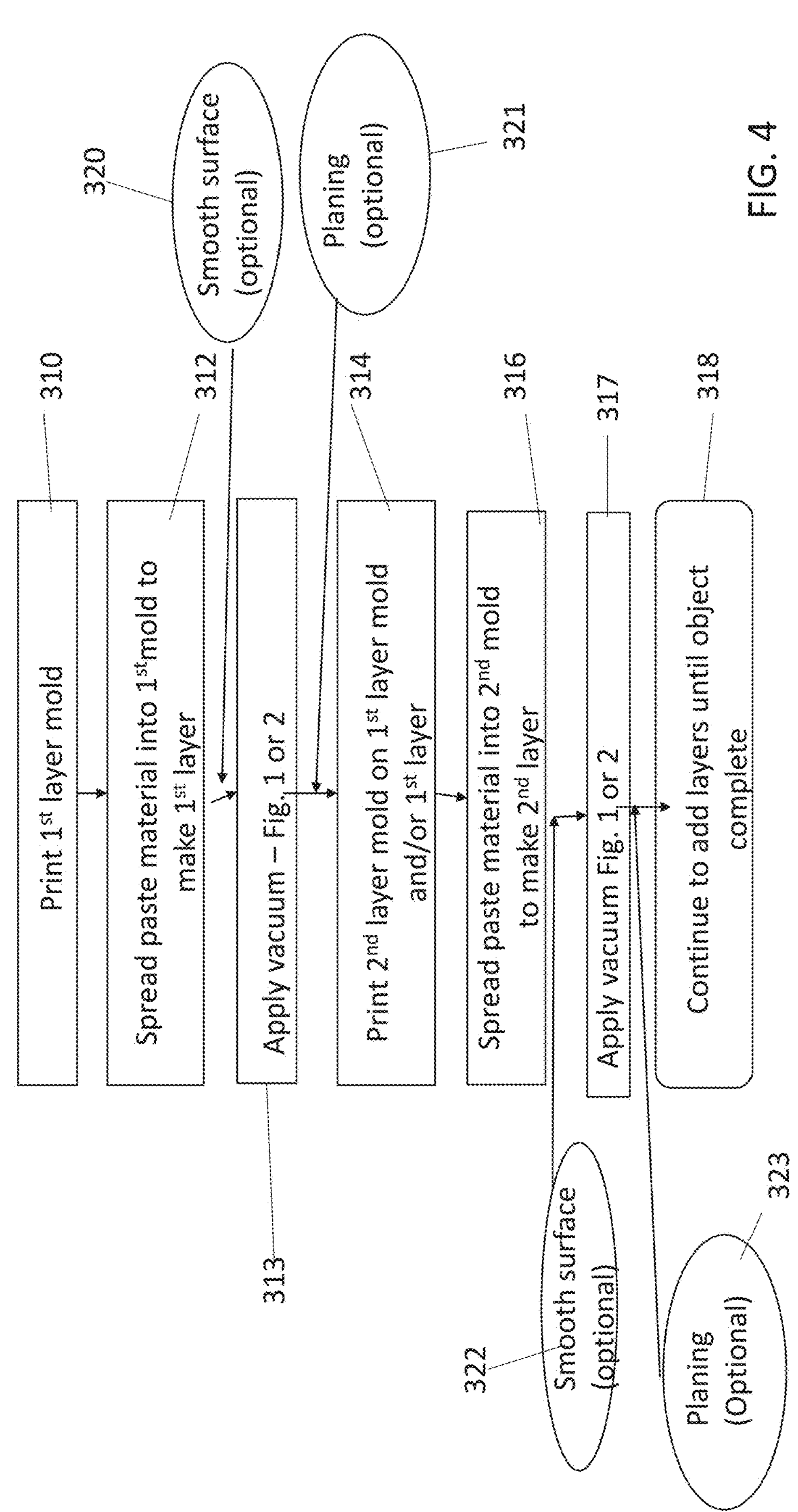
FIG. 4 is a simplified flow chart illustrating a procedure for producing a layered molded product or part according to some embodiments of the present invention.

As shown in box 20 in FIG. 4, smoothing may be carried out of the layer currently being formed. Smoothing may be carried out before hardening by running a spatula, blade or the like over the surface. Alternatively or additionally, smoothing may be carried out after hardening, say by cutting away any unwanted protrusions using a planing process. As a further alternative, smoothing may be carried out before and planing after hardening. In either case a smooth surface may be provided as the base for printing the mold for the following layer. This is to ensure that the next layer is produced on a finished surface of the preceding layer.

Figure 3:
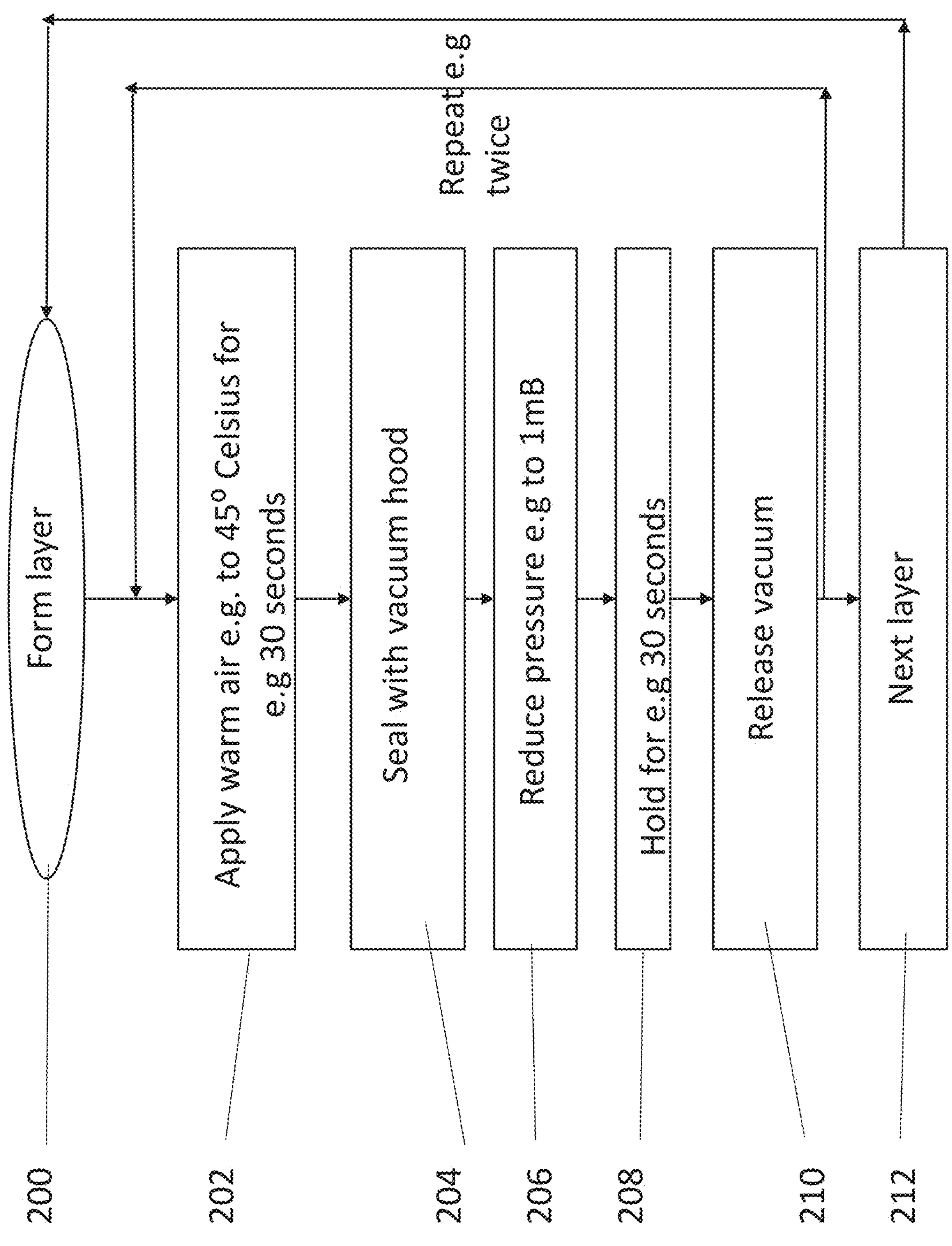
FIG. 3 is a simplified flow chart showing a variation of the procedure of FIGS. 1A-B in which certain hardening phases are repeated for individual layers.

Reference is now made to FIG. 3, which shows a variation of the embodiment shown in FIG. 2. Parts that are the same as in FIG. 2 are given the same reference numerals and are not discussed again except as needed for understanding the present variation. As shown in FIG. 3, sealing 204, applying a vacuum by reducing pressure 206, holding for a preset time 208, and releasing the vacuum, are repeated for individual layers, so that the vacuum may be applied twice, three times or more for individual layers.

Heating 202 may also be applied twice, three times or more. In an embodiment, the vacuum hood remains over the layer throughout the cycle. The layer is initially heated, then the vacuum hood is applied. The vacuum is applied and held for the requisite time and then released by allowing warmed air into the vacuum hood. The vacuum is then reapplied by evacuating the hood of the warmed air.

Planing may be carried out with each layer after hardening.

In an embodiment the hardness of the layer is tested after one cycle. If the hardness is below a predetermined level then a further cycle is carried out.

In more detail, after printing the mold, applying the paste formulation and filling the mold with the squeegee, the paste is wet. In the next process, the air-drying process, part of the liquids in the paste are removed, however, the layer is not hard enough and cannot survive the planing process.

The vacuum stage dries and removes most the liquids trapped in the object during build up.

After applying the vacuum process, the layer may be hard enough to withstand the cutting (planing) process, and there is a correlation between hardness and strength—and a hard layer means a strong green strength for the part. Green strength is discussed in greater detail below.

There are several methods and scales to measure hardness, and common methods used in engineering and metallurgy fields are Indentation hardness measures. Common indentation hardness scales are Rockwell, Vickers, Shore, and Brinell, amongst others, and in an embodiment, a Shore A hardness test is carried out using a durometer. Layers that achieved a level at or above 90 Shore hardness could be effectively planed. Layers whose hardness was below 90 Shore A could be damaged in the planing process. Thus in an embodiment, if a cycle of vacuum and heat does not harden the layer to 90 Shore A hardness, and then the cycle is repeated. If the required hardness is reached then no further cycles are used.

In a further embodiment, the vacuum hood may be placed initially over the layer as soon as it is formed, and the initial heating may also be carried out by inserting warmed air into the hood. The subsequent vacuum may in some embodiments involve warmed air at suitably low pressure. Other methods of heating include using infra-red radiation. Radiation heating may be applied during the vacuum.

It is noted that successive layers of the object may be made of the same materials, facilitating fusion of the layers. Alternatively, different cast material formulations may be used in different layers, say when the final product requires different mechanical properties in different places.

Reference is now made to FIG. 4, which is a simplified flow chart showing a method of manufacturing a molded layered object according to the present embodiments. A first box 310 indicates printing a first mold to define one layer of the object. The mold may be printed using known Additive Manufacturing technology (e.g., 3D inkjet printing). Box 312 indicates spreading a cast material formulation (according to the present embodiments) to fill the mold printed in box 310. A squeegee may spread the cast material formulation across the mold.

The cast material formulation, in a form of paste, may then form a first layer of the eventual molded layered object but is currently soft, containing an amount of a liquid (an organic vehicle as described herein), and the procedure outlined in FIG. 2 or 3 may be applied to harden the layer—box 313.

In box 314 a second layer mold is then printed on the first layer and/or on the first molding layer. In some cases the second layer is smaller than the first layer in at least one dimension, so that the second layer mold is deposited on the cast material portion of the first layer. As will be discussed in greater detail below, the cast material layer has now been hardened to support the printing of the second layer mold.

In box 316 more cast material formulation is poured into the second layer mold to form the second layer of the object. As shown in box 317 the hardening procedure of FIG. 2 or 3 is carried out. As shown in box 318, further layers are added to form a molded layered product or part with the requisite number of layers.

After pouring and optionally before or after hardening or both, the new surfaces of the cast material layers may optionally be smoothed, finished, planed or polished with finishing tools as shown in 320, 321, 322 and 323.

The molds may be printed using any standard mold material that is strong enough to hold the cast material, as described herein. In embodiments the layer may be cast, and in such cases the mold may be required to hold the cast material at casting temperatures and other casting conditions.

Any standard 3D printing technique, such as fused deposition modeling (FDM) or 3D Inkjet printing, may be used to print the mold.

In embodiments, the mold printing material has a melting point temperature which is lower than a melting point of the cast material or other filling material, so that heating can be used to clean away the mold once the product is ready. Alternatively, the mold can be removed by dissolving in a suitable solvent.

In some embodiments, the final object may then be heated to melt the mold material, or may be immersed in solvent to dissolve the mold material, and then may be immersed in solvent to leaching out part of the additives and/or may be heated to a higher temperature to remove the binders and also may be further sintered to fuse the powder and may even be subjected to other common thermal processes such as HIP (Hot Isotropic Pressure). Thus the present embodiments may provide a way to make molded ceramic or metal or compound products.

In some embodiments, the mold material may have a viscosity which is higher than the viscosity of the cast material formulation, so that the mold remains intact when the cast material formulation is spread. The cast material formulation may have good wetting properties to fill the mold.

Dispensing the cast material formulation (e.g., by spreading and/or pouring) into the mold layer may be carried out at an elevated temperature, with tight control of materials to provide the mechanical properties necessary. Pouring may use a liquid dispensing system that consists of a dispensing control unit. The quantity of the cast material formulation may be set according to supplied sub mold parameters such as volume, overflow factor, etc. Then the cast material formulation may be leveled by mechanical means such as a squeegee, as mentioned above, or a blade or under its own self leveling property with an optional vibrating procedure.

Later on, the Sub Molds, that is the molds of the individual layers, may be removed by exposing the assembly to a higher temperature, or using a chemical dissolving process say with an acid or by immersion in solvent to dissolve the mold material or other processes. Suitable temperatures in the case of a wax based mold may be in the range of 100-200° C.

A debinding and sintering stage may involve increasing the temperature to allow debinding and sintering of the active part of the cast material, and typical temperatures for de binding and sintering are in the range of 200° C.-1800° C. depending on the exact material and required mechanical properties of the final product.

According to a proposed process according to the present embodiments, a cast material paste formulation is dispensed under high shear forces and under controlled temperature. The paste cast material in this embodiment may be deposited over the previous layer of a hardened cast material.

When two successive layers are composed of the same material, they may be expected to share properties. Drying and sintering may be carried out in ovens, which may be integrated in a single device or may be provided separately.

The process of FIG. 4 is now considered in greater detail.

A paste cast material formulation may be dried and hardened at a temperature higher than the freeze temperature and lower than the mold material melting point. To ensure the stability of the first layer of cast material the cast material formulation is designed to possess rheological properties that cause the still non-flowing material to be hardened and when needed, to include appropriate shear thinning and thixotropy, so that the viscosity may or may not vary.

Referring again to FIG. 4, and the process comprises as in box 310, building of the mold, in which 3D printing may use a mineral wax having a melting point of at least 120° C. to form the mold parts.

The mold is then filled 312 with the cast material formulation according to the present embodiments. The cast material formulation may be poured, or may in embodiments be injected, under a high shear force into the mold to ensure intimate contact with the mold walls, thereby to ensure proper and complete filling of the mold. The mold itself may be mechanically strong enough to cope with the injection forces.

The now formed (n−1) layer provides a base for the next, the $n^{th}$, layer.

Hardening the paste as shown in FIGS. 2 and 3, may render the layer capable of bearing the load of the subsequent layer of mold material.

The process then continues by printing the next mold layer 314.

The second mold layer may be printed on the surface of the previous layer and may even be built over mold material from the previous layer.

The next stage is to fill the second mold layer, in a similar manner to that carried out for the first layer—316. Hardening 317 may also be provided separately for the second layer.

For each additional layer needed in the object, the stages of printing, filling, optionally heating, and hardening are repeated—318.

The hardened cast material in the shape of the final object, is now embedded within the Sub Molds, that is the mold produced for each layer.

The final object may optionally be stabilized once all the layers have been manufactured. While stopping the shear forces, the cast material formulation may start hardening, thus developing green strength to the cast material.

The mold material may then be removed. Removal may involve heating the product and mold up to the melting point of the mold so that the mold material liquidizes and can be collected for re-use. Alternatively, and preferably, the mold may be removed by chemical dissolution as described herein.

In general the hardening process of FIGS. 2 and 3 has removed the liquid carrier (the organic vehicle) from the cast material. Other materials such as binder materials may now be removed by controllably heating to an optimal temperature. The mold has already been removed so that heating is no longer limited by the mold melting point.

After the sacrificial materials are removed, the powder may be fused into solid form. A thermal treatment such as sintering, may be applied to obtain the desired final properties for the product. Exemplary temperatures as described herein may be used.

An exemplary mold casting process which can advantageously utilize the formulation of the present embodiments is described in WO2018/203331, which is incorporated herein by reference as if fully set forth herein.

An exemplary mold casting process which can advantageously utilize the formulation of the present embodiments is described in U.S. Provisional Patent Application No. 62/724,120, which is incorporated herein by reference as if fully set forth herein.

According to an aspect of some embodiments of the present invention there is provided a product obtained by a method as described herein in any of the respective embodiments and any combination thereof.

According to an aspect of some embodiments of the present invention there is provided a 3D mold-cast object obtainable by the mold-cast process as described herein in any of the respective embodiments and any combination thereof.

According to an aspect of some embodiments of the present invention there is provided a green body obtainable by the mold-cast process as described herein in any of the respective embodiments and any combination thereof, upon removal of the mold material.

According to an aspect of some embodiments of the present invention there is provided a brown body obtainable by the mold-cast process as described herein in any of the respective embodiments and any combination thereof, upon removal of the mold material and the binder material(s) and any other additives.

According to an aspect of some embodiments of the present invention there is provided a 3D mold-cast object obtainable by the mold-cast process as described herein in any of the respective embodiments and any combination thereof.

Articles-of-Manufacturing:

According to an aspect of some embodiments of the present invention there is provided an article-of-manufacturing or a part thereof, which comprises the product as described herein (e.g., a product obtained using the sinterable paste formulation as described herein, optionally prepared using a method as described herein).

Exemplary articles-of-manufacturing or parts thereof include, but are not limited to, large articles such as cars, trucks, railway cars, airframes, aircraft engines, marine vessels, sailing ship masts, street lighting poles, railway tracks, oil well casings, hydroelectric turbines, nuclear reactor control rods, windows, doors, mirrors, astronomical instruments, etc. Small articles such as car engines, gears, fasteners, watches, cooking utensils, food containers, bicycle components, packaging, outer shells of consumer electronics, heat sinks for electronic appliances, substrates in high brightness light-emitting diode (LED) lighting, hardware tools, and many other metallic articles.

It is expected that during the life of a patent maturing from this application many relevant molding, 3D printing and casting technologies will be developed and the scopes of the corresponding terms are intended to include all such new technologies a priori.

It is expected that during the life of a patent maturing from this application many relevant mold materials, sinterable materials, binder materials, and any of the other materials usable in the present embodiments will be developed and the scope of the corresponding terms is intended to include all such new technologies a priori.

As used herein the term "about" refers to +10% or +5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Exemplary Formulations

The materials used to make up an exemplary formulation according to the present embodiments, containing stainless steel powder as the sinterable material, are presented in Table 1 below.

TABLE 1

| Component | % wt. |
|---|---|
| Powder of a sinterable material | 85-95 |
| Binder material (total amount) | 1-2 |
| organic vehicle (total amount) | 4-10 |
| Thickening agent | 0.1-1 |
| Dispersant | 0.01-0.5 |

An exemplary formulation according to some embodiments of the present invention comprises:

As a powder of sinterable material: Stainless steel 316L powder, featuring average particles size of 8-10 microns, e.g., d50: 9 microns, obtained from Huarui China.

As Binder materials—a mixture of NeoCryl B-817, Neocryl-B-842, and Joncryl®682, at a total amount of 1-2% by weight, and at a weight ratio of from about 1:1:1 to about 1:2:3.

As a Dispersant—an anionic aliphatic ester as described herein.

As a thickening agent—a co-binder as described herein.

As an organic vehicle—a mixture of PM and 2-butanone (methyl ethyl ketone; MEK), at a ratio of from about 1:1 to 2:1.

Tables 2 and 3 present additional exemplary formulations 1-5, containing copper powders (Table 2) and exemplary formulations 6-10, containing titanium powders (Table 3), according to some embodiments of the present invention.

TABLE 2

| | 1 | 2 | 3A | 3B | 4 | 5 |
|---|---|---|---|---|---|---|
| Copper powder D50 22 μm | 93% | 94% | 93.5% | 93.5% | 94% | 94.5% |
| Isopropyl alcohol (IPA) | | | | | 0.4% | |
| Dowanol PM | | | | | | 0.6% |
| Butyl Acetate | | | | | 1.2% | |
| n-Butanol | 4.1% | 3.0% | | | | |
| Propyl methyl Ketone (PMK) | | | | | 2.2% | 3.0% |
| Methyl Ethyl Ketone (MEK) | 2.0% | 1.7% | 1.8% | 1.9% | 0.8% | 0.4% |
| Methyl Iso Butyl Ketone (MIBK) | | | 3.7% | 3.8% | | |
| DISPERBYK ®-111 | 0.1% | 0.1% | 0.2% | xx | 0.1% | 0.5% |
| Ethyl Cellulose | 0.4% | | 0.4% | 0.4% | 0.3% | 0.2% |
| Paraloid ® B82 | | 0.5% | | | | |
| Butvar ® B72 | | 0.2% | | | | |
| Elvacite ® 2042 | | | 0.4% | 0.4% | 0.6% | 0.8% |
| Sum | 100.0% | 100.0% | 100.0% | | 100.0% | 100.0% |

TABLE 3

| | 6 | 7 | 8 | 9 | 10 |
|---|---|---|---|---|---|
| Titanium powder D50 12 μm | 86.6% | 86.9% | 88.3% | 88.0% | 87.9% |
| Methyl Ethyl Ketone (MEK) | 3.7% | 3.6% | 3.2% | 3.1% | 3.0% |
| Propyl methyl Ketone (PMK) | | 8.0% | | | 7.0% |
| Methyl Iso Butyl Ketone (MIBK) | 7.9% | | 7.0% | 7.3% | |
| DISPERBYK ®-106 | 0.3% | 0.2% | 0.1% | 0.2% | 0.3% |

TABLE 3-continued

| | 6 | 7 | 8 | 9 | 10 |
|---|---|---|---|---|---|
| 151207 SAIB-100 80% | | | | 1.0% | 0.9% |
| Elvacite ® 2042 | 0.8% | | 0.7% | | |
| Paraloid ® B-66 | | 0.9% | 0.1% | | |
| Butvar ® B-79 | | | | 0.4% | |
| Ethyl Cellulose | 0.7% | 0.4% | 0.6% | | 0.8% |
| | 100.0% | 100.0% | 100.0% | 100.0% | 100.0% |

Example 2

An exemplary formulation according to the present embodiments, as presented in Tables 2 and 3 above, was used in a mold-cast 3D printing method as described herein, while drying the formulation under reduced pressure, as described herein. As a mold material formulation was used a mineral wax, for example, a mixture of Fisher-Tropsch polyolefine wax, micronized wax and some oxidized wax and/or natural wax.

Once the mold casting process is finalized, the mold material (e.g., a hydrocarbon wax as described herein) is removed by heat and melt the mold material or/and by contacting the obtained printed object with an aliphatic organic solvent (e.g., heptanes) at an elevated temperature (e.g., 50-70° C.), to thereby provide a green body made of the cast material.

The formulations presented in Tables 2 and 3 were used in a mold-cast process (the Moldjet® technology) as described above, using Dominant machine (Tritone Ltd.).

Figure 5A:
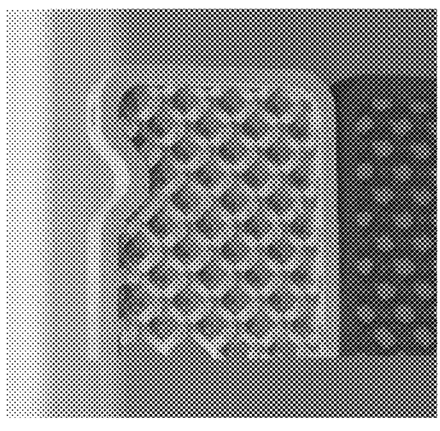
FIGS. 5A-B present photographs of green parts printed on the Dominant printer (Tritone Ltd.) using the Moldjet® technology, upon employing an exemplary copper powder-containing sinterable formulation according to some of the present embodiments with (FIG. 5A) and without (FIG. 5B) a dispersing agent.
Figure 5B:
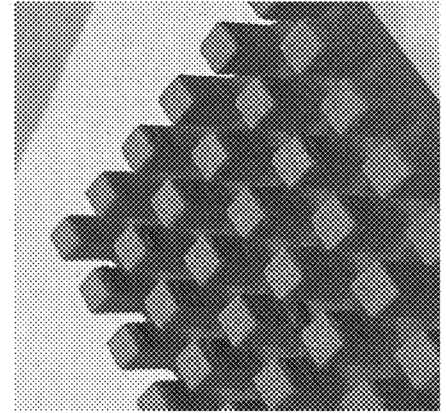

FIGS. 5A-B presents photographs of exemplary green bodies prepared from exemplary formulations 3A and 3B (Table 2), respectively, showing the effect of a suitable dispersant on the oxidation rate of the metal.

Figure 6:
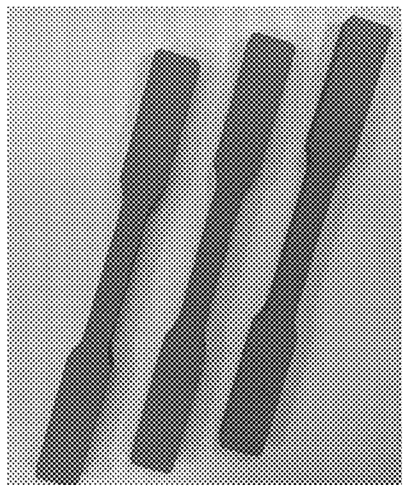
FIG. 6 presents a photograph of green parts printed on the Dominant printer (Tritone Ltd.) using the Moldjet® technology, upon employing a titanium powder-containing sinterable formulation according to exemplary embodiments of the present invention.

FIG. 6 presents photographs of exemplary green bodies prepared from exemplary formulation 10 (Table 3).

The obtained green body is then subjected to the following post treatment:

The obtained green body is subjected to debinding (removal of the binder material(s), to thereby provide a "brown body". Debinding is performed by application of heat, for example, at 250-650° C., 2-10 Torr.

The brown body is then subjected to sintering, at a temperature ranging from 1000 to 1400° C., at 2-10 Torr.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A sinterable paste formulation usable as a cast material in a cast-mold process in combination with a mold material formulation, the sinterable paste formulation comprising a powder of a sinterable material, a binder material and an organic vehicle, wherein an amount of said powder is at least 85% by weight of the total weight of the formulation; and an amount of water in the formulation is less than 1% of the total weight of the formulation, and wherein said organic vehicle comprises at least one organic material that has an evaporation rate in a range of from 0.3 to 0.8, on an n-butyl acetate scale, in an amount of at least 50% by weight of the total weight of the organic vehicle, wherein:

said powder of said sinterable material comprises a plurality of spherical particles having an average particles size (d50) lower than 20 micrometers;

said organic vehicle further comprises at least one organic material that has an evaporation rate higher than 2, on an n-butyl acetate scale;

a total amount of said organic vehicle ranges from 4 to 15% by weight of the total weight of the formulation; and an amount of said binder material is no more than 10%, by weight of the total weight of said formulation.

2. The formulation of claim 1, wherein said organic vehicle and said binder material are selected such that said binder material is dissolvable and/or dispersible in said organic vehicle; and/or as chemically inert to one another; and/or as capable of physically interacting with one another.

3. The formulation of claim 1, wherein an amount of said binder material ranges from 0.5 to 2% by weight of the total weight of the formulation.

4. The formulation of claim 1, wherein said binder material is thermolizable at a temperature lower by at least 100° C. than a sintering temperature of said sinterable material.

5. The formulation of claim 1, wherein said binder material: remains intact when subjected to a condition under which said mold material is removed; and/or has a Tg of at least 25° C.

6. The formulation of claim 1, wherein said binder material comprises a mixture of at least two binders, and wherein each of said binders has a Tg in a range of from 25 to 150° C.

7. The formulation of claim 1, wherein said binder material is characterized by a film forming temperature (TMF) of at least 0° C.

8. The formulation of claim 1, wherein said binder material is devoid of an aqueous solution.

9. The formulation of claim 1, wherein said mold material formulation comprises a hydrocarbon of at least 20 carbon atoms.

10. The formulation of claim 1, comprising:

from 85 to 95% by weight of said powder of said sinterable material;

from 4 to 10% by weight of said organic vehicle; and from 0.8 to 2% by weight of said binder material.

11. The formulation of claim 1, wherein said powder of said sinterable material;

comprises in at least a portion thereof a gas-atomized powder.

12. The formulation of claim 1, wherein said sinterable material is a metal.

13. The formulation of claim 12, wherein said metal is an oxygen-sensitive metal.

14. A process of preparing the formulation of claim 1, the process comprising mixing said binder material, said organic vehicle and said powder at room temperature.

15. A method of forming a three-dimensional object which comprises a sintered material, the method comprising:

forming a mold according to a shape of the object, using a mold material formulation;

filling the mold with a sinterable formulation according to claim 1, to thereby obtain a mold-cast product;

removing the mold from said mold-cast product, to thereby obtain a green body;

removing said binder from said green body to thereby obtain a brown body; and subjecting the brown body to a sintering condition, thereby forming said object.

16. The method of claim 15, wherein forming said mold comprises forming a layered mold by dispensing a plurality of layers of said mold material formulation in a configured pattern corresponding to the shape of the object.

17. The method of claim 16, comprising:

printing a first layer of said mold material to define one layer of said layered mold;

filling said first mold with said sinterable formulation, thereby forming a first mold-cast layer;

printing a second layer of said mold on top of said first mold-cast layer to define a second layer of said layered mold; and filling said second layer, over said first layer, with said sinterable formulation.

18. The method of claim 17, further comprising, subsequent to said filling, hardening said mold-cast layer.

19. The method of claim 18, wherein said hardening comprises subjecting the mold-cast layer or object to a reduced pressure for a pre-determined time period.

20. The method of claim 19, further comprising, prior to subjecting to a reduced pressure, applying hot air to said mold-cast layer or object.

21. The method of claim 19, wherein said reduced pressure ranges from 0.01 millibar to 100 milliBar.

22. The method of claim 19, wherein said pre-determined time period ranges from 10 to 150 seconds, or is about thirty seconds.

* * * * *